United States Patent
Horii et al.

(10) Patent No.: US 8,599,427 B2
(45) Date of Patent: Dec. 3, 2013

(54) LABEL DESIGN PRODUCING APPARATUS

(75) Inventors: Nobuyuki Horii, Tokyo (JP); Mikihiro Kajihara, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 350 days.

(21) Appl. No.: 12/816,493

(22) Filed: Jun. 16, 2010

(65) Prior Publication Data

US 2010/0249966 A1    Sep. 30, 2010

Related U.S. Application Data

(62) Division of application No. 12/153,407, filed on May 19, 2008, now abandoned.

(30) Foreign Application Priority Data

May 25, 2007 (JP) ................. 2007-139483

(51) Int. Cl.
  *G06K 15/00* (2006.01)
(52) U.S. Cl.
  USPC ........................ 358/1.18; 358/1.12
(58) Field of Classification Search
  None
  See application file for complete search history.

(56) References Cited

U.S. PATENT DOCUMENTS

| | | | |
|---|---|---|---|
| 4,718,784 A * | 1/1988 | Drisko | 400/68 |
| 5,951,174 A * | 9/1999 | Handa | 400/120.01 |
| 6,591,076 B2 | 7/2003 | Connors | |
| 2002/0075502 A1 * | 6/2002 | Hayama | 358/1.15 |
| 2003/0044200 A1 | 3/2003 | Connors | |
| 2004/0210832 A1 * | 10/2004 | Iwanaga et al. | 715/505 |

FOREIGN PATENT DOCUMENTS

| | | |
|---|---|---|
| CN | 1198130 A | 11/1998 |
| JP | 08-052908 | 2/1996 |
| JP | 08-090841 | 4/1996 |
| JP | 2000-318251 | 11/2000 |
| JP | 2004-255725 | 9/2004 |

OTHER PUBLICATIONS

CAMM-1 SERVO GX-24, http://www.rolanddg.com/product/cutting/gx-24/gx-24.html, searched for on Apr. 24, 2008.

* cited by examiner

*Primary Examiner* — Twyler Haskins
*Assistant Examiner* — Lennin Rodriguezgonzalez
(74) *Attorney, Agent, or Firm* — Bacon & Thomas, PLLC

(57) ABSTRACT

A label design producing apparatus of the present invention comprises a first memory unit in which a plurality of designs are stored, a second memory unit in which label combination information expressing each design by combination of a plurality of rectangular labels is stored, a selecting unit for selecting a design to be employed from designs stored in the first memory unit, a reading-out unit for reading out the label combination information corresponding to the design selected by the selecting unit from the second memory unit, and an output unit for outputting labels constituting the design according to the label combination information read out by the reading-out unit.

16 Claims, 22 Drawing Sheets

FIG.4

| LABEL DESIGN | | CONSTITUENT LABEL NO. | TAPE WIDTH (mm) | TAPE COLOR | LENGTH (cm) | BACKGROUND PATTERN (BACKGROUND IMAGE) | CHARACTER INPUT |
|---|---|---|---|---|---|---|---|
| NO. | TITLE | | | | | | |
| 1 | ARROW | 1 | 12 | – | 5 | NONE | AVAILABLE |
| | | 2 | 12 | – | 3 | NONE | N/A |
| | | 3 | 12 | – | 3 | NONE | N/A |
| 2 | HOUSE | 1 | – | RED | 2 | NONE | AVAILABLE |
| | | 2 | – | RED | 6 | NONE | AVAILABLE |
| | | 3 | – | RED | 8 | NONE | AVAILABLE |
| | | 4 | – | RED | 4 | NONE | AVAILABLE |
| | | 5 | – | RED | 4 | NONE | AVAILABLE |
| 3 | GIRAFFE | 1 | 18 | YELLOW | 2 | YES | N/A |
| | | 2 | 18 | YELLOW | 6 | YES | AVAILABLE |
| | | 3 | 18 | YELLOW | 6 | YES | AVAILABLE |
| | | 4 | 18 | YELLOW | 1 | YES | N/A |
| ... | | ... | ... | ... | ... | ... | ... |

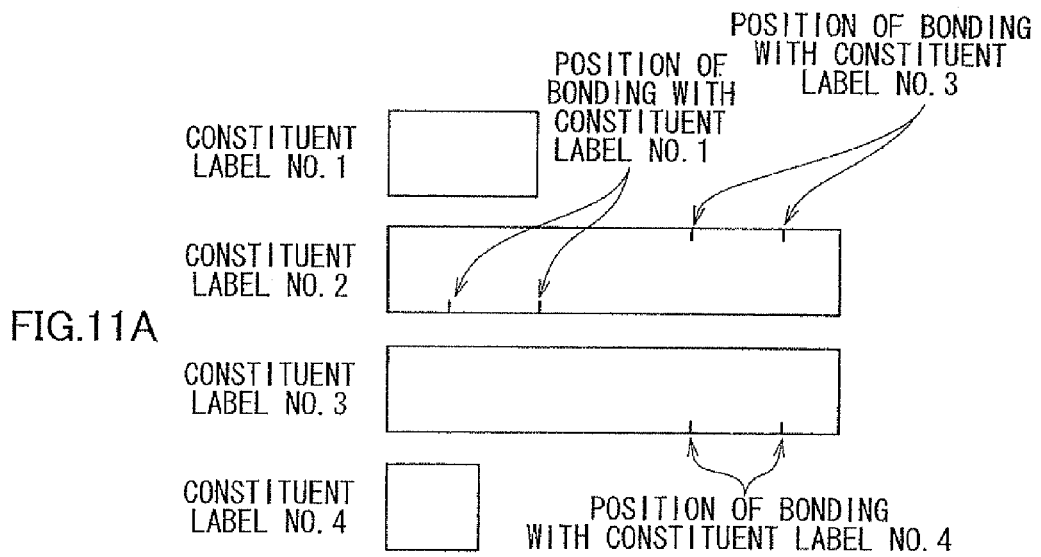
FIG.11A
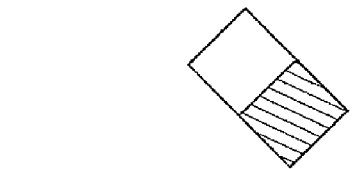
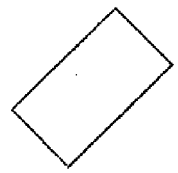
FIG.11B
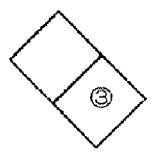
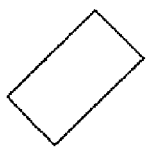
FIG.11C

CONSTITUENT LABEL NO. 1

CONSTITUENT LABEL NO. 2 — CUTTING LINE

CONSTITUENT LABEL NO. 3

LABEL DESIGN PRODUCING APPARATUS

CROSS-REFERENCE TO RELATED APPLICATION

This application claims, under 35 USC 119, priority of Japanese Application No. 2007-139483 filed May 25, 2007.

BACKGROUND OF THE INVENTION

1. Field of the Invention

The present invention relates to a label design producing apparatus. The present invention can be applied to a label design producing apparatus that produces a label design in a given shape by combining a plurality of pieces of rectangular tape, for example.

2. Description of the Related Art

Design stickers cut into shapes of characters, symbols, figures or the like, for example, are widely used as signs on shop windows or as guidance signs in facilities or the like. Also, affixation of design stickers on personal belongings such as a file, for example, is often practiced.

When this type of design sticker is to be used, typically, a desired design sticker is produced by using a cutting machine described in Document 1, for example, or finished design stickers are purchased at a stationery shop or the like.

However, since a conventional cutting machine is too large and expensive, such a cutting machine can not be purchased easily, and production of stickers is difficult. Thus, there is a demand that a design sign with good visible quality is able to be produced simply and easily.

There are conventional label producing apparatuses that produce a label on which a character, symbol or a figure is printed on rectangular tape. Such label producing apparatuses can produce labels simply and easily, and they are widely used in offices and homes.

Conventionally, the labels produced by such label producing apparatuses are limited to labels with a given size in the width direction. As an example of the related art for producing a label with a width-direction size larger than that of a set tape, there is an enlargement printing technology described in Document 2, but since rectangular tape is used, there is no designability in the combined label shapes themselves.

Document 1: Cutting machine product information, "CAMM-! SERVO GX-24", online, Roland DG Corporation, searched for on Apr. 28, 2008<URL://www.rolanddg.com/product/cutting/gx-24/gx-24.html>

Document 2: Japan Patent Office, Japanese Patent Laid-Open No. 8-52908

As mentioned above, there is a demand that a design sign with good visible quality to some extent is able to be produced simply and easily.

The conventional label producing apparatus produces a label by using rectangular tape, and a produced label also turns out to be of a rectangular shape. There is a working technology in which the label shape is rounded by cutting a corner of the label, but the designability of the label shape is limited in this case, too.

SUMMARY OF THE INVENTION

An object of the present invention is to allow labels to be produced for forming a specific label design by combining a plurality of labels.

A label design producing apparatus comprises a first memory unit in which a plurality of designs are stored, a second memory unit in which label combination information expressing the plurality of designs by using respective combinations of a plurality of labels is stored, a selecting unit for selecting at least one design from the plurality of designs stored in the first memory unit, a reading-out unit for reading out label combination information corresponding to the design selected by the selecting unit from the second memory unit, and an output unit for outputting each label constituting the design according to the label combination information read out by the reading-out unit.

Here, the first memory unit and second memory unit do not have to be a physically different memory unit and they may be an identical memory unit.

A label design producing apparatus according to a second aspect of the present invention is provided with a first memory unit in which a plurality of designs are stored, a selecting unit for selecting a design to be employed from the designs stored in the first memory unit, an expanding unit for generating label combination information expressing the design in combination of labels from the design selected by the selecting unit, and an output unit for outputting a label constituting design according to the label combination information generated by the expanding unit.

A label design producing apparatus according to a third aspect of the present invention is provided with an input unit for inputting a design, an expanding unit for generating label combination information expressing the design by a combination of labels from the design inputted by the input unit, and an output unit for outputting a label constituting the design according to the label combination information generated by the expanding unit.

A label design producing apparatus according to a fourth aspect of the present invention is configured such that the label design producing apparatus of the first aspect of the present invention is further provided with an image forming region setting unit for setting a region in which one or plural images are formed in a region formed by bonding rectangular labels specified by the label combination information, an image producing unit for determining an image to be formed in the region, and an image forming unit for forming the image determined by the image producing unit in a region set by the image forming region setting unit.

A label design producing apparatus according to a fifth aspect of the present invention is configured such that the label design producing apparatus of the second aspect of the present invention is further provided with an image forming region setting unit for setting a region in which one or plural images are formed in a region formed by bonding rectangular labels specified by the label combination information, an image producing unit for determining an image to be formed in the region, and an image forming unit for forming the image determined by the image producing unit in a region set by the image forming region setting unit.

A label design producing apparatus according to a sixth aspect of the present invention is configured such that the label design producing apparatus described in the third aspect of the present invention is further provided with an image forming region setting unit for setting a region in which one or plural images are formed in a region formed by bonding rectangular labels specified by the label combination information, an image producing unit for determining an image to be formed in the region, and an image forming unit for forming the image determined by the image producing unit in a region set by the image forming region setting unit.

A label design producing apparatus according to a seventh aspect of the present invention is configured such that the label design producing apparatus described in the first aspect of the present invention is further provided with an image forming region setting unit for setting a region in which one or plural images are formed in a region formed by bonding labels specified by the label combination information, an image input unit for inputting an image to be formed in the region, and an image forming unit for forming the image inputted by the image input unit in a region set by the image forming region setting unit.

A label design producing apparatus according to an eighth aspect of the present invention is configured such that the label design producing apparatus described in the second aspect of the present invention is further provided with an image forming region setting unit for setting a region in which one or plural images are formed in a region formed by bonding labels specified by the label combination information, an image input unit for inputting an image to be formed in the region, and an image forming unit for forming the image inputted by the image input unit in a region set by the image forming region setting unit.

A label design producing apparatus according to a ninth aspect of the present invention is configured such the label design producing apparatus described in the third aspect of the present invention is further provided with an image forming region setting unit for setting a region in which one or plural images are formed in a region formed by bonding labels specified by the label combination information, an image input unit for inputting an image to be formed in the region, and an image forming unit for forming the image inputted by the image input unit in a region set by the image forming region setting unit.

A label design producing apparatus according to a tenth aspect of the present invention is configured such that the label design producing apparatus described in the first aspect of the present invention is further provided with an display unit for displaying a guide indicating how to bond each label on a screen and a guide output unit for forming and outputting an image on a label different from the label constituting the design.

A label design producing apparatus according to an eleventh aspect of the present invention is configured such that the label design producing apparatus described in the second aspect of the present invention is further comprised with a display unit for displaying a guide indicating how to bond each label on a screen and a guide output unit for forming and outputting an image on a label different from the label constituting the design.

A label design producing apparatus according to a twelfth aspect of the present invention is configured such that the label design producing apparatus described in the third aspect of the present invention is further provided with a display unit for displaying a guide indicating how to bond each label on a screen and a guide output unit for forming and outputting an image on a label different from the label constituting the design.

A label design producing apparatus according to a thirteenth aspect of the present invention is configured such that the label design producing apparatus described in the first aspect of the present invention is further provided with a guide image forming unit for forming an image of guide of position where another label is bonded onto one label in a label design in which the another label is bonded onto the one label in an overlapped manner, wherein an image of a symbol for identifying the label is formed on the another label and the image of the symbol is formed at the position where the another label is bonded onto the one label.

A label design producing apparatus according to a fourteenth aspect of the present invention is configured such that the label design producing apparatus described in the second aspect of the present invention is further provided with a guide image forming unit for forming an image of guide of position where another label is bonded onto one label in a label design in which the another label is bonded onto the one label in an overlapped manner, wherein an image of a symbol for identifying the label is formed on the another label and the image of the symbol is formed at the position where the another label is bonded onto the one label.

A label design producing apparatus according to a fifteenth aspect of the present invention is configured such that the label design producing apparatus described in the third aspect of the present invention is further provided with a guide image forming unit for forming an image of guide of position where another label is bonded onto one label in a label design in which the another label is bonded onto the one label in an overlapped manner, wherein an image of a symbol for identifying the label is formed on the another label and the image of the symbol is formed at the position where the another label is bonded onto the one label.

BRIEF DESCRIPTION OF THE DRAWINGS

FIG. 4 is a table showing a configuration example of a label-design shape setting form storage portion of the first embodiment;

FIGS. 8A and 83 are display examples of a combination method of label designs showing that a shaded portion is a bonded portion of the first embodiment;

FIGS. 11A to 11C are diagrams illustrating a completed example of a constituent label in an "arrow" shape of the first embodiment;

DESCRIPTION OF THE PREFERRED EMBODIMENTS

(A) First Embodiment

A first embodiment of a label design producing apparatus of the present invention will be described below in detail referring to the attached drawings.

In the first embodiment, a case in which the present invention is applied to a dedicated label design producing apparatus (label producing apparatus) is assumed in the description.

It is needless to say that the present invention assumes software processing is used to realize predetermined processing by executing a processing program by a CPU as will be described later, and the present invention can be applied to a label producing apparatus connected to a personal computer 39 and a stand-alone label producing apparatus.

The label design here has a specific shape that can be created by combining a plurality of rectangular labels, and characters, symbols, figures or combinations of them and the like are printed thereon, as necessary. Each label constituting the label design is referred to as a constituent label. The label design producing apparatus creates and discharges the constituent labels constituting the label design. The concept of the constituent labels includes not only labels with characters, symbols, figures, and background patterns printed thereon but also those without them. Moreover, as the constituent labels, colored tape, non-colored tape, transparent tape and the like can be applied or even magnet tape, iron tape and the like can be applied.

(A-1) Configuration of the First Embodiment

Figure 1:
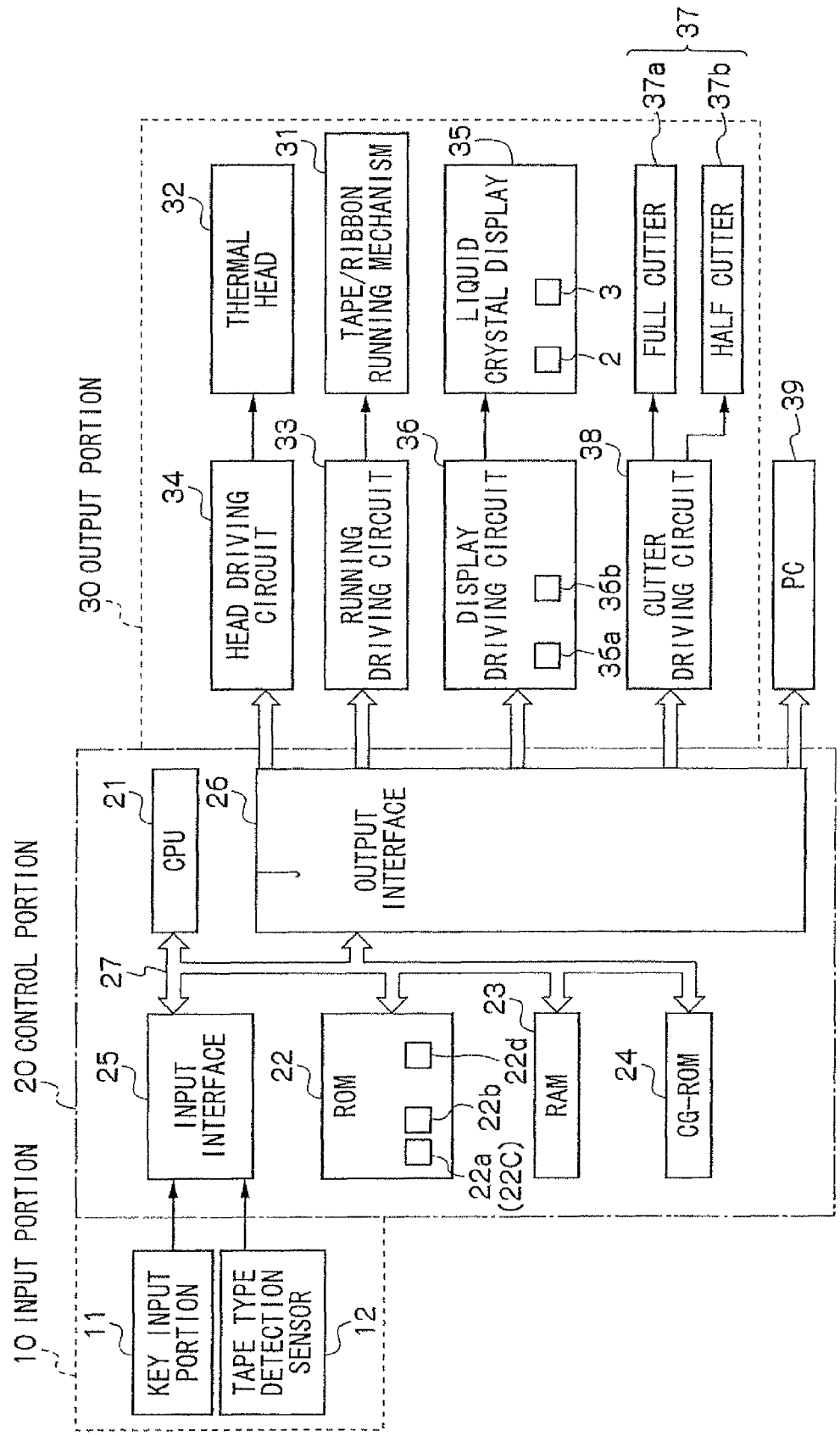
FIG. 1 is a block diagram illustrating electric configuration of a label design producing apparatus of a first embodiment.
Figure 2:
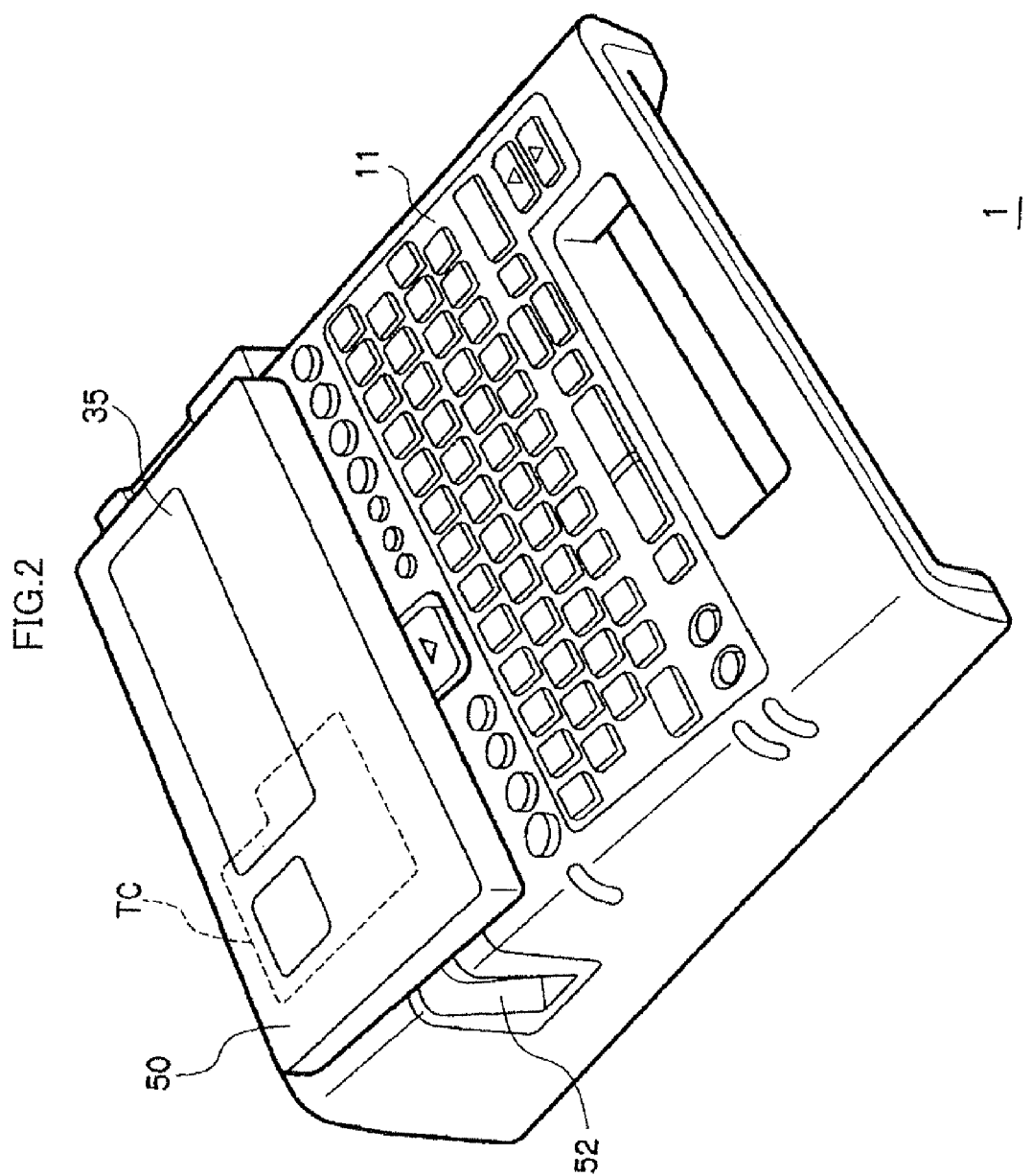
FIG. 2 is an appearance perspective view of the label design producing apparatus of the first embodiment.

FIG. 1 is a block diagram illustrating an electrical configuration of a label design producing apparatus of the first embodiment. FIG. 2 is a schematic perspective view illustrating the appearance of the label design producing apparatus of the first embodiment.

In FIG. 2, a label design producing apparatus 1 of the first embodiment comprises at least a key input portion 11 having keys such as character and symbol keys, function keys, control keys and the like as an operation panel, a liquid crystal display 35 for displaying inputted characters and symbols or displaying a finished image of a label, and a discharge port 52 for discharging constituent tape constituting a label design (including tape on which a character, symbol, figure or the like is printed).

In FIG. 2, the label design producing apparatus 1 can contain a tape cartridge TC within an apparatus housing and is provided with a lid body 50 for covering a space in which the tape cartridge TC is contained. The liquid crystal display 35 is provided on this lid body 50.

In FIG. 1, the label design producing apparatus 1 of the first embodiment mainly comprises an input portion 10, a control portion 20, and an output portion 30.

The input portion 10 is provided with the key input portion 11 and a tape type detection sensor 12.

The key input portion 11 is provided with the above-mentioned various keys and gives a key signal of a key pressed down by a user (character code data, control data or the like, for example) to an input interface 25 of the control portion 20. In the first embodiment, it is assumed that the keys of the key input portion 11 are mechanical keys but they may be keys operated on a screen such as a touch panel.

The tape type detection sensor 12 detects tape type information such as tape width, color (including transparent) and the like of the loaded tape cartridge TC and gives the tape type information to the control portion 20. As the tape type information detecting method, physical identification elements constituted by holes specifying the tape width, color and the like are provided on the tape cartridge TC in advance, for example, and the tape type detection sensor 12 detects the tape type information by reading out the physical identification elements.

The output portion 30 is constituted by a print portion and a display portion. The print portion is for printing on tape, while the display portion is for displaying input information to be printed on tape, messages of operation guidance and the like.

As the print portion, a thermal head 32 is fixedly provided and conducts printing by thermal transfer onto running tape. A tape/ribbon running mechanism 31 is configured around a stepping motor or a DC motor, for example, for feeding out loaded tape or an ink ribbon, not shown, to a predetermined print position or outside the apparatus. The thermal head 32 and the tape/ribbon running mechanism 31 are driven by a head driving circuit 34 and a running driving circuit (including a motor and the like) 33, respectively, under control of the control portion 20.

Cutting of the printed tape is carried out by a cutter 37 driven by a cutter driving circuit (including a motor and the like) 38 under control of the control portion 20. The cutter 37 for cutting comprises a full cutter 37a for cutting a front sheet and a back sheet together in a full-cutting mode and a half cutter 37b for cutting only the front sheet without cutting the back sheet in a half cutting mode under the control of the control portion 20.

Next, the liquid crystal display 35 that can display characters with a predetermined size in several lines (4 lines, for example) of several characters (12 characters, for example), for example, is provided as the display portion, and the liquid crystal display 35 is driven by a display driving circuit 36 under the control of the control portion 20. Since the liquid crystal display 35 comprises a dot display portion 2 for displaying input character strings, line numbers, print image, length information and the like and an attribute indicator portion 3 (3-1 to 3-n), the display driving circuit 36 also mainly comprises a driving portion 36a corresponding to the dot display portion 2 and a driving portion 36b corresponding to the attribute indicator portion 3.

The control portion 20 comprises a micro computer, for example, and has a CPU 21, a ROM 22, a RAM 23, a character generator ROM (CG-ROM) 24, the input interface 25, and an output interface 26 connected through a system bus 27.

The ROM 22 comprises a single ROM chip or plural ROM chips and stores various processing programs and fixed data such as dictionary data for kana-kanji conversion. In the first embodiment, the ROM 22 stores a label design production program 22a and a label design setting form storage portion 22b.

The label design production program 22a is a program for producing a plurality of constituent labels constituting the label design so that a label design can be made up by combining the plurality of labels.

Figure 3:
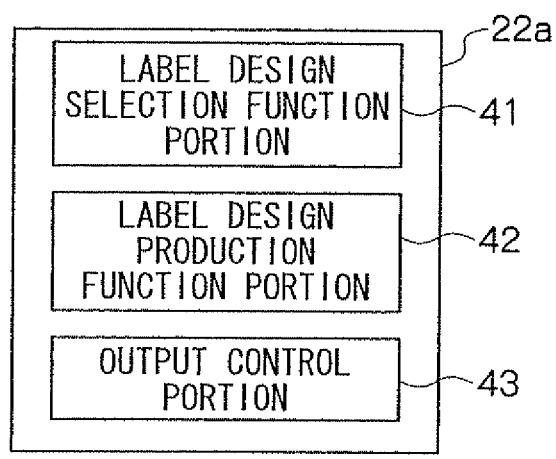
FIG. 3 is a functional block diagram illustrating functional configuration of a label design production program of the first embodiment.

FIG. 3 is a functional block diagram for explaining a function realized by execution of the label design production program 22a.

As shown in FIG. 3, the function realized by the label design production program 22a has at least a label design selection function portion 41, a label design production function portion 42, and an output control portion 43.

The label design selection function portion 41 displays types of label design set in the label design setting form storage portion 22b and obtains a setting format of a label design selected by a user from the label design setting form storage portion 22b in the label design production processing.

The label design production function portion 42 produces constituent labels required to form a label design on the basis of the setting format of the label design selected by the user and obtained by the label design selection function portion 41.

The output control portion 43 realizes a predetermined function when the constituent labels produced by the label design production function portion 42 are outputted.

By executing the label design production program 22a, the label design producing apparatus 1 can output rectangular labels (constituent labels) constituting the label design. By the user combining the constituent labels, a desired label design can be made simply and easily.

The label design setting form storage portion 22b stores the setting form of a plurality of label designs set in advance.

FIG. 4 shows a constitution example of the setting form of label designs stored in the label design setting form storage portion 22b. As exemplified in FIG. 4, the label design setting form storage portion 22b stores a plurality of label designs set in advance and label combination information to constitute the label designs. By this arrangement, the user can form a label design by just selecting a design.

In FIG. 4, the setting form of the label design setting form storage portion 22b has a "label design" as an item. Also, the form has "constituent label number (No.)", "tape width", "tape color", "length", "background pattern (background image)", and "character input" as items for label combination information.

The "label design" has items of "identification number (No.)" and "title" to identify label designs. The "constituent label number (No.)" is a number for identifying each constituent label constituting a label design. The "tape width" is a length of the constituent label in the tape width direction, the "tape color" is the color of the constituent label tape, and the "length" is the length of the constituent label in the length direction.

The "background pattern (background image)" is an item for indicating whether a background pattern is printed on the tape or not, and the "character input" is an item for indicating whether it is a constituent label capable of being input with characters. The item of the "background pattern" may store an identification number determined as the background pattern in the setting form of a separately provided background pattern.

The background pattern, in the case of the design of a "giraffe", for example, is set in the setting form in advance so that a large number of black circles with a given size can be printed on tape. By this arrangement, when a rectangular label is outputted, a label on which a large number of black circles are automatically printed, for example, can be outputted on the basis of information set in the setting form.

The character input is configured so that the characters inputted by a user can be printed and outputted on a label. At this time, the label for the character input can be specified by the user. Alternatively, it may be so configured that the input characters may be printed across a plurality of labels.

Figure 5A:
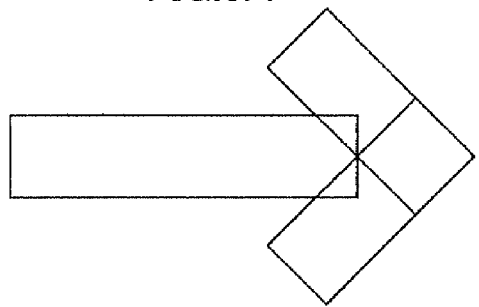
FIGS. 5A to 5C are completed image diagrams of a label design shape of the first embodiment.

For example, in FIG. 4, the shape of an "arrow" can be formed by combining three constituent labels. Then, as shown in FIG. 4, setting is performed so that the three constituent labels with the "lengths" of "5 cm", "3 cm", and "3 cm" are produced. As for the "tape width" of the shape of the "arrow", use of tape with a width of "12 mm" is set as default setting, and the "tape color" is not set but contains "−". The constituent label of the "constituent label No. 1" is a label capable of being input with characters. When these three pieces of the constituent labels are combined, the shape of the "arrow" as shown in FIG. 5A can be formed.

Figure 5B:
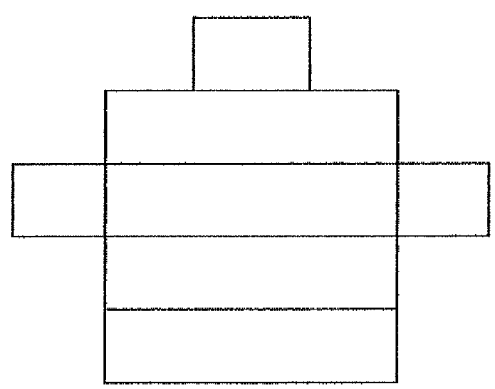

Also, for example, in FIG. 4, the shape of a "house" is set so that five constituent labels with the "lengths" of "2 cm", "6 cm", "8 cm", "4 cm" and "4 cm" can be produced by using tape with the "tape width" of "12 mm". The "tape color" of the shape of the "house" is set to a "red" tape as default, but the "tape width" is not set. Also, all the constituent labels are labels capable of being input with characters. By combining these five constituent labels, the shape of the "house" as shown in FIG. 5B can be formed.

Moreover, for example, in FIG. 4, the shape of a "giraffe" is set so that four constituent labels with the "lengths" of "2 cm", "6 cm", "6 cm" and "1 cm" are produced. For the shape of the "giraffe", use of a "yellow" tape with the "tape width" of "18 mm" is set as a requirement. Also, all the constituent labels are labels on which a background pattern is printed, and the "constituent label No. 2" and the "constituent label No. 3" are labels capable of being input with characters. When these four constituent labels are combined, the shape of the "giraffe" as shown in FIG. 5C can be formed.

FIG. 4 is an example of a setting form of the label design setting form storage portion 22b, and the setting form may be provided with an item not shown in FIG. 4. For example, an item of image shape showing a finished image of a constituent label may be provided and image data of each label design may be stored.

Figure 5C:
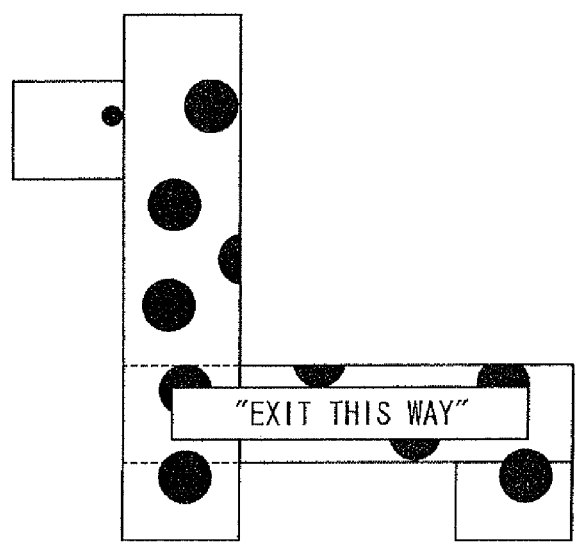

As shown in FIG. 5C, in the case of character input, the length of a constituent label into which characters are inputted (a label with "Exit this way", for example) may be changed according to the number and size of inputted characters. By this arrangement, if the number of inputted characters is two, for example, a design label of a "giraffe" with a short torso can be created, while if the number of inputted characters is five, a design label of a "giraffe" with a long torso can be made.

Moreover, the length of a constituent label into which characters are inputted may be fixed. By this arrangement, since a region into which characters can be inputted is fixed, if the number of characters is small, character size can be increased or an interval between characters can be widened while if the number of characters is large, the character size can be made smaller and the interval between characters can be narrowed.

The RAM 23 is constituted by a single RAM chip or plural RAM chips and used as a working memory and also stores fixed data and the like relating to user input. In FIG. 1, it is described as the RAM 23, but it is a concept including other memory devices (EEPROM, for example) used as a working memory. The RAM 23 has a print buffer for storage of dot-extension of a character string to be printed, a display buffer for storing a display image of an input character string and the like, a text buffer for storing character data and the like relating to printing and input, a row-number state holding buffer for holding a display mode regarding a row number, an attribute indicator state holding buffer for holding a display mode relating to the attribute indicator portion 3 and the like.

The CG-ROM 24 stores dot patterns of characters and symbols prepared in the label design printing device 1 and outputs a corresponding dot pattern when code data specifying a character or symbol is provided. Separate CG-ROM may be provided for displaying and printing. The storage format of font information may be either one of an outline font format and a bitmap format.

The input interface 25 serves as an interface between the input portion 10 and the control portion 20, while the output interface 26 serves as interface between the output portion 30 and the control portion 20.

The CPU 21 executes a processing program in the ROM 22 determined according to an input signal from the input portion 10 or a processing stage at that time by using the RAM 23 as a working area and also using fixed data stored in the ROM 22 and RAM 23 as appropriate when necessary, and displays the processing state, processing result and the like on the liquid crystal display 35 or prints them on tape.

(A-2) Operation of the First Embodiment

Figure 6:
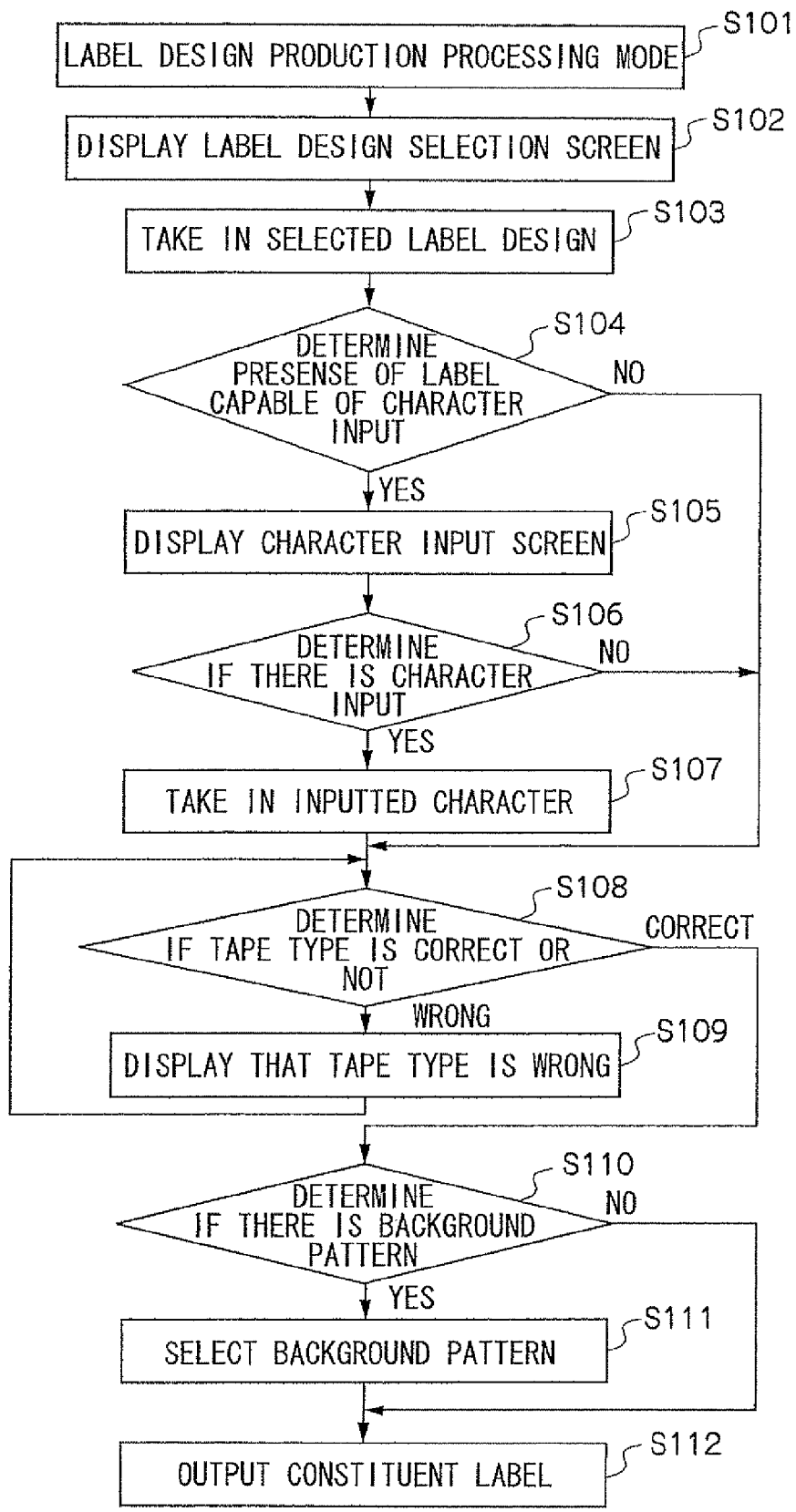
FIG. 6 is an operational flowchart illustrating a label design production processing of the first embodiment.

Next, an operation of the label design production processing of the first embodiment will be described in detail referring to the attached drawings. FIG. 6 is an operational flowchart for explaining the label design production processing of the first embodiment.

First, upon receipt of an operation by a user who is to produce a label design, the CPU 21 is brought in a label design production processing mode for executing the label design production program 22*a* (Step S101).

Figure 7A:
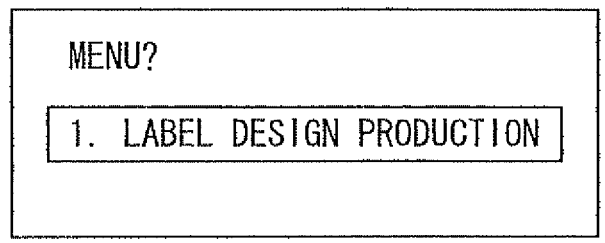
FIGS. 7A and 7B are selection screen examples displayed on a liquid crystal display of the first embodiment.

FIG. 7A illustrates a screen example of a menu screen displayed on the liquid crystal display 35. As a method for setting the label design production processing mode, a method in which a user selects an option of executing the label design production processing by operating the key input portion 11 while looking at the menu screen displayed on the liquid crystal display 35 can be applied, for example. At this time, the user can apply a method of selection by moving a cursor to the option to execute the label design production processing or a method of inputting an option number and operating an execution key and the like. As another method of starting the label design production processing mode, a method can be applied in which a dedicated key for starting the processing mode of the label design production processing is provided, for example, so that the user operates the dedicated key.

When the CPU 21 is brought in the label design production processing mode, the CPU 21 displays a selection screen for allowing selection of a label design set in the label design setting form storage portion 22*b* on the liquid crystal display 35 (Step S102).

Figure 7B:
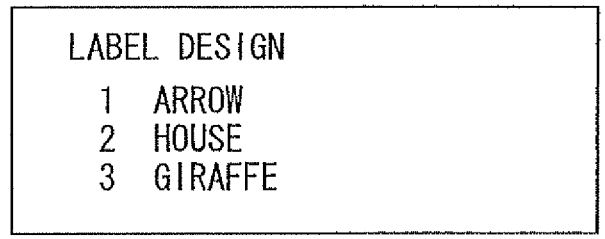

FIG. 7B shows a screen example of the selection screen of the label design displayed on the liquid crystal display 35. This label design selection screen displays the "label design number (No.)" and "title" of all the label designs set in the label design setting form storage portion 22*b* as options.

At this time, if images of the shapes of the label designs are stored in the label design setting form storage portion 22*b*, the images of the label designs may be displayed together. Alternatively, only the image of the shape of the label design may be displayed.

When the label design selection screen is displayed on the liquid crystal display 35, the CPU 21 accepts in the label design selected by the user (Step S103).

The CPU 21 refers to the label design setting form storage portion 22*b* for the label design selected by the user and determines whether it or not has a constituent label capable of being input with characters among in a plurality of constituent labels (Step S104).

If the selected label design has a constituent label capable of being input with characters, the CPU 21 displays a character input screen on the liquid crystal display 35 (Step S103). If there is no constituent label capable of character input, the routine goes to Step S108.

When the character input screen is displayed on the liquid crystal display 35, the user operates the key input portion 11 and inputs a character, symbol, figure and the like to be printed on the constituent label. At this time, an enlarged character can be inputted so that characters, symbols, figures and the like can be printed across a plurality of constituent labels.

If the user does not want to input characters, the user may finish the character input processing by selecting an option such as "character input finished" or the like on the screen display, for example, without inputting a character.

When a character is inputted by the user (Step S106), the CPU 21 accepts the inputted character (Step S107). If no character is inputted by the user, the CPU 21 finishes the character input processing, and the routine goes to Step S108.

Next, the CPU 21 receives a tape type detection result from the tape type detection sensor 12 and determines whether or not the type (tape width, tape color) of the currently loaded tape matches the "tape width", "tape color" of the corresponding label design shape set in the label design setting form storing portion 22*b* on the basis of the tape type detection result (Step S108).

If the currently loaded tape type (tape width, tape color) does not match the "tape width", "tape color" set in the label design setting form storage portion 22*b*, the CPU 21 displays, on the liquid display 35, the fact that the tape cartridge TC with the set "tape width", "tape color" is not correctly loaded (Step S109).

At this time, the CPU 21 may display the "tape width", "tape color" set in the label design setting form storage portion 22*b* at the same time. By this arrangement, tape of the tape type that needs to be replaced by can be indicated to the user.

When the user looks at the display screen on the liquid crystal display 35 and changes to the tape cartridge TC set in the label design setting form storage portion 22*b*, the CPU 21 determines that the tape type set in the label design setting form storage portion 22*b* is loaded on the basis of the tape type detection result from the tape type detection sensor 12 (Step S108), and the routine goes to Step S110.

In the label design production processing shown in FIG. 6, here, the routine shall not move to the subsequent processing till the user loads a correct tape cartridge TC. However, as will be described later, if production is to be carried out with the tape type specified by the user, different from the "tape width", "tape color" of the label design set in the label design setting form storage portion 22b, the routine can go to the subsequent processing without replacement of the tape cartridge TC.

Next, the CPU 21 refers to the label design setting form storage portion 22b and determines if the background pattern is set for the label design selected by the user or not (Step S110).

If the background pattern is set for the selected label design, the CPU 21 has the background pattern corresponding to the selected label design selected (Step S111).

Here, various methods can be applied as a method of selecting a background pattern, but there can be a method in which a setting form of a plurality of background patterns set in advance is stored and the background pattern corresponding to the selected label design is picked out, for example. At this time, the background pattern setting form sets information on region in which the background pattern is printed. For example, in order to enable automatic printing of a large number of black circles for the label of "giraffe", information on the size of the circles, the interval between the circles and the like is set, for example.

If there is no background pattern setting for the selected label design, the CPU 21 goes to Step S112.

At Step S112, the CPU 21 refers to the label design setting form storage portion 22b and produces each constituent label constituting the label design selected by the user by having the tape cut to a specific length.

In the production of each constituent label, for a constituent label requiring input characters or a background pattern to be printed, the CPU 21 prints the input characters and the background pattern on the tape and then, cuts the tape at a predetermined length so as to produce the constituent label on which the input characters and the background pattern are printed.

Here, as the discharge processing of each constituent label, each produced constituent label may be sequentially discharged as it is.

Alternatively, a combination method showing how to bond the constituent labels to create the label design may be shown at discharge of the constituent labels. By showing the combination method as above, the user can combine the labels while referring to the combination method and the label design shape can be formed extremely easily and occurrence of bonding errors can be reduced.

A "guide label" and a "bonding position" shown in FIGS. 8, 11, and 24 described below are included in the concept of "guide" in the present invention. As will be described in FIG. 9, display of the label combination method on the display unit is also included in the concept of the "guide" in the present invention.

FIG. 8 is an explanatory diagram for explaining an example showing display of the combination method of label design shapes.

Figure 8A:
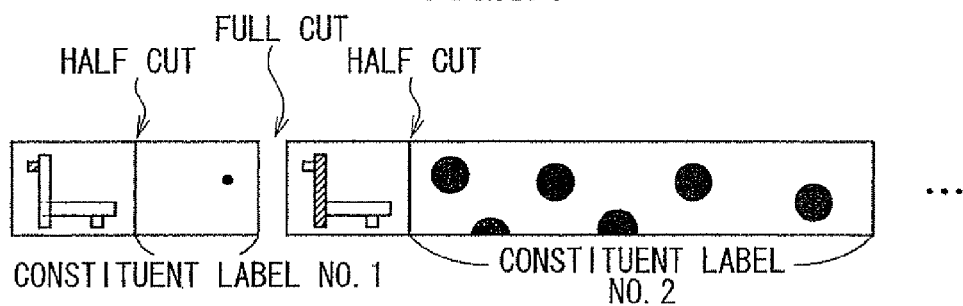

For example, as shown in FIG. 8A, the CPU 21 has a finished image of the label design and a guide label showing to which portion the constituent label corresponds printed at the beginning of the label when each constituent label is to be discharged. In FIG. 8A, a shaded portion indicates a bonding position of the constituent label. Also, the CPU 21 has a region between the guide label portion and the constituent label main body portion cut by a half cut. Also, the CPU 21 has a region between each constituent label cut by a full cut. By this arrangement, a relation between the constituent label main body and the guide label can be shown to the user easily to be understood.

Figure 8B:
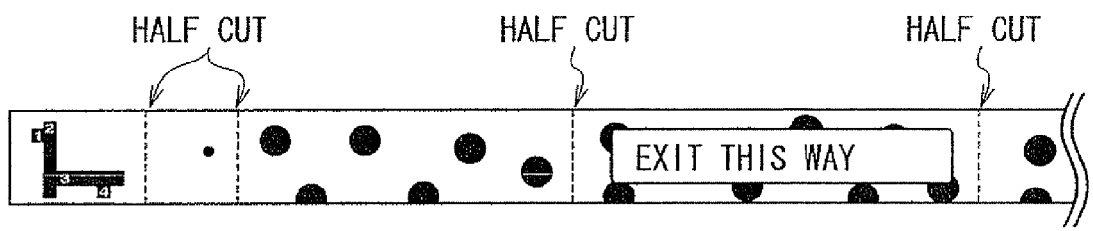

Alternatively, as shown in FIG. 8B, the CPU 21 has the finished image of the label design and the guide label giving a number to each label printed at the beginning of the label, for example. The numbers shown on the guide label correspond to the sequential order in which the constituent labels are discharged after the label display (or correspond to the constituent label numbers). The CPU 21 has a region between the guide label portion and each constituent label and a region between each constituent label cut by a half cut.

The guide label shown in FIG. 8A and the guide label shown in FIG. 8B may be outputted in combination.

Figure 24:
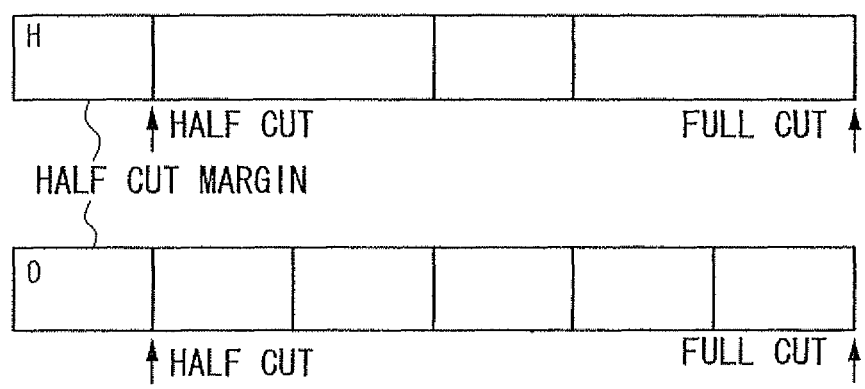
FIG. 24 is an explanatory diagram for explaining an example showing display of a combination method of label design shapes of the first embodiment.

Alternatively, as shown in FIG. 24, when two or more separate constituent labels of a label design are to be produced such as "H" and "O" and the like, for example, each label group may be outputted as follows. For example, for the "H", a constituent label group of "H" is produced by printing the guide label at the label beginning similarly to FIG. 8B, and when production of the constituent label group is finished, it is cut by a full cut. At this time, regions between a plurality of the constituent labels of "H" are half-cut. After that, for the subsequent "O", the constituent label group is produced similarly to the "H".

Moreover, the CPU 21 may display a combination method on the liquid crystal display 35. FIG. 9 is an explanatory diagram for explaining a display example of the combination method of the label design displayed on the liquid crystal display 35.

Figure 9A:
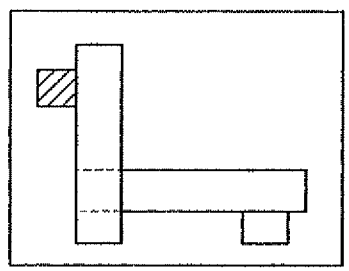
FIG. 9 is an explanatory diagram for explaining a display example of a combination method displayed on a liquid crystal display of the first embodiment.
Figure 9B:
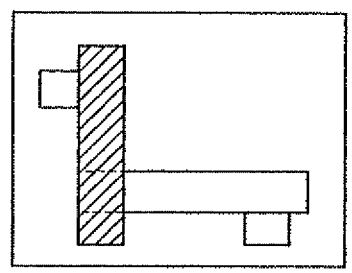

As shown in FIG. 9, the CPU 21 displays the finished image of the label design and the combination sequence of the constituent labels on the liquid crystal display 35. For example, after the display screen in FIG. 9A is displayed, the screen is switched to the display screen in FIG. 9B for display. The display is switched repeatedly as above till the label design is finished.

In this case, for example, the combination sequence information for displaying the sequence to combine the labels may be set in the setting form in advance so that the CPU 12 can display the label combination method by controlling the display driving circuit 36 based on the combination sequence information in the setting form.

As a method of switching the display screen, for example, the CPU 12 may carry out switching control of the screen every predetermined time or may conduct switching (selection) upon receipt of operation of the key input portion 11 by the user. Alternatively, automatic switching every predetermined time and selection by user operation may be both provided.

Alternatively, the combination method may be displayed on the liquid crystal display 35 shown in FIG. 9 together with the printing of the guide label shown in FIG. 8A or FIG. 8B.

Moreover, the CPU 21 may have marks indicating a position at which the constituent labels are to be bonded together printed.

FIGS. 10, 11 and 25 are diagrams illustrating print examples of the positions at which the constituent labels are to be bonded together.

Figure 10A:
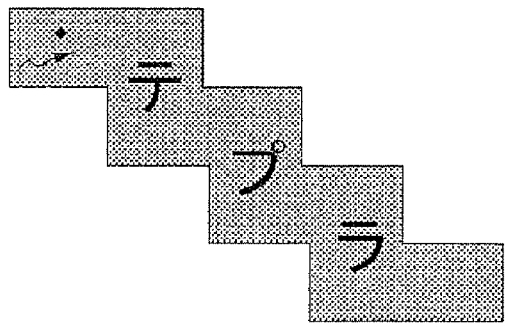
FIGS. 10A to 10C are views illustrating a print completed example in a constituent label in a "snake" shape of the first embodiment.
Figure 10B:
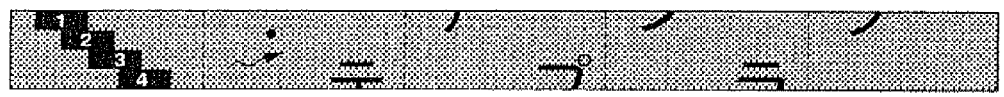
Figure 10C:
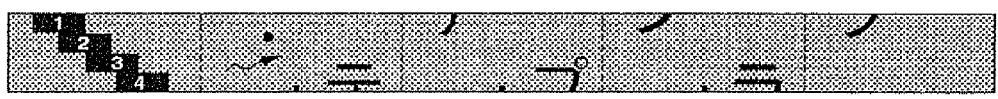

For example, in FIG. 10, constituent labels in the shape of a "snake" are shown. Also, FIG. 10 is an example of a case of printing of characters across a plurality of labels. FIG. 10A shows a finished state of the label design. As shown in FIG. 10A, Japanese katakana characters of "te", "pu", "ra" are printed across the labels of the upper and lower parts, respectively. In this case, as shown in FIG. 10B, the CPU 21 has the guide label printed at the label beginning and also has parts of characters corresponding to each constituent label printed. Alternatively, as shown in FIG. 10C, the CPU 21 has an index (mark) indicating a bonding position of the constituent labels printed. At this time, the index (mark) indicating the bonding position may be given to a half-cut margin of the constituent label or printing may be performed in such a way that the index (mark) showing the bonding position can be concealed by bonding the constituent labels together. By this arrangement, when bonded together, the index (mark) indicating the bonding position can be concealed, and a label design with a clear finish can be formed.

For example, in FIG. 11A, constituent labels in the "giraffe" shape are shown. Among them, as shown in a "constituent label No. 2", the CPU 21 has the indexes (marks) indicating the bonding position for a "constituent label No. 1" and a "constituent label No. 3" printed. Also, as shown in the "constituent label No. 3", the CPU 21 has the indexes (marks) indicating the bonding position of a "constituent label No. 4" printed. By this arrangement, the bonding position of the constituent labels can be shown to the user so as to be easily understood, and the label design can be formed easily.

FIG. 11B, for example, shows constituent labels in the "arrow" shape. As shown in FIG. 11B, the CPU 21 performs printing on the overlap portions so that the portions where the constituent labels are bonded together (overlap portion) can be known. By this arrangement, the label design can be formed easily by the user bonding the constituent labels on the overlapping portions.

Moreover, FIG. 11C shows constituent labels in the "arrow" shape. As shown in FIG. 11C, the CPU 21 has the numbers of the constituent labels to be overlapped printed at an overlapped portion of the constituent labels. By printing the numbers as above, the constituent labels to be overlapped can be identified, and the label design can be formed more easily.

Figure 25A:
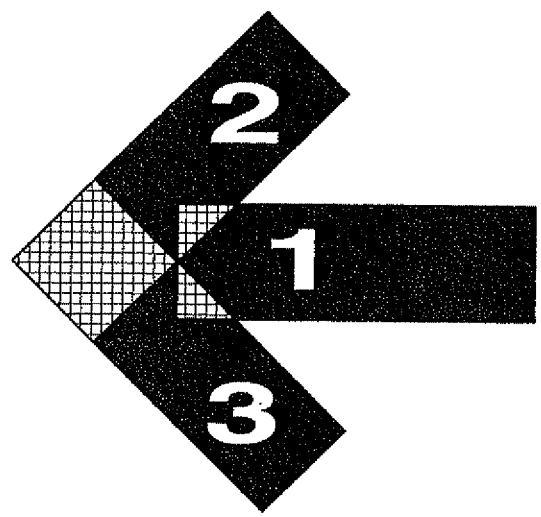
FIGS. 25A and 25B are diagrams illustrating a print example of a position of bonding the constituent labels together of the first embodiment.
Figure 25B:
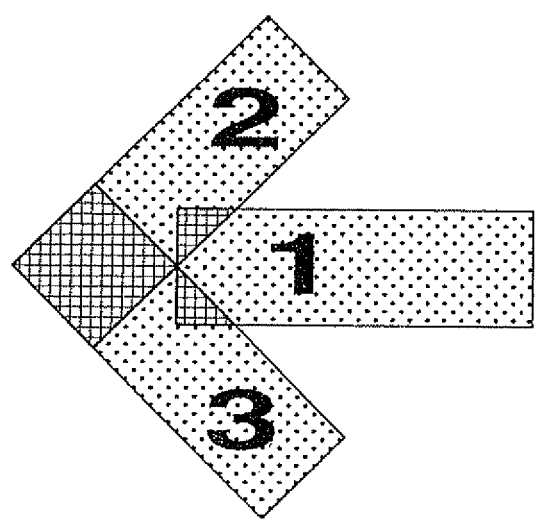

As shown in FIGS. 25A and 25B, the overlap portions of the constituent label are shown by dots. By this arrangement, even with a label producing apparatus capable of only single color printing, plural sheets of overlapped portions can be expressed.

Figure 12A:
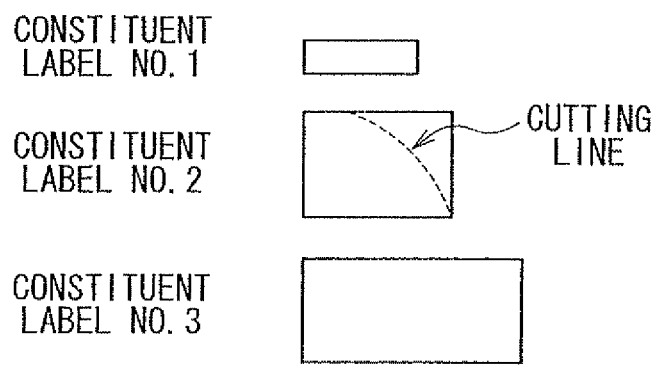
FIGS. 12A and 12B are diagrams illustrating an example of a case where a cutting line is printed on a constituent label of the first embodiment and a completed example of the constituent label.
Figure 12B:
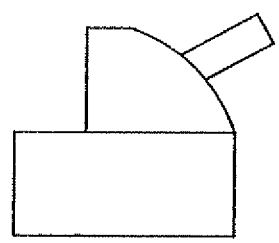

An example of displaying the combination method of the constituent labels is shown in the above, but other than that, the CPU 21 may also print a cutting line in the constituent labels. FIG. 12 is a diagram illustrating an example when the cutting line is printed on the constituent label.

For example, in FIG. 12, constituent labels in the shape of a "tank" are shown. Among them, as in a "constituent label No. 2", the CPU 21 prints a cutting line. After that, when the user separates it along the cutting line, the label of the "constituent label No. 2" can be rounded. That is, since the rectangular label can be deformed, the label design can have variations.

As mentioned above, the label design producing apparatus 1 can discharge the constituent labels constituting the label design selected by the user, and by the user combining the constituent labels, the desired label design can be formed.

Figure 13A:
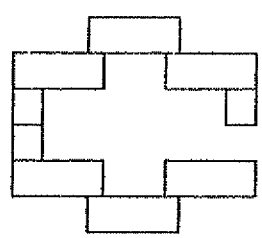
FIGS. 13A and 13B are diagrams illustrating an example of a case where a character is formed as a label design shape of the first embodiment.
Figure 13B:
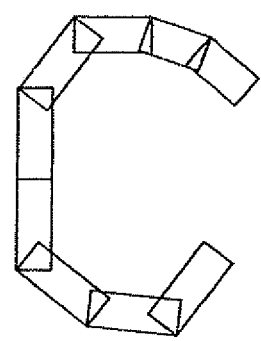

Other than the label design examples shown in FIG. 5, characters may be formed as shown in FIG. 13, for example. For example, FIGS. 13A and 13B are an example of forming an alphabet character "C", but the combination methods used to form the alphabet character "C" are different. That is, the example in FIG. 13A shows a case where the label is formed so that orientations of the width direction axis and the length direction axis of each of the constituent labels are the same, while the example in FIG. 13B shows a case where the label is formed so that length direction axes of the constituent labels are arranged along the character shape of "C".

In FIG. 13, an alphabet character is used as an example for explanation, but shapes of "hiragana", "katakana", "kanji", "numerals" and the like may be formed by labels.

Figure 23A:
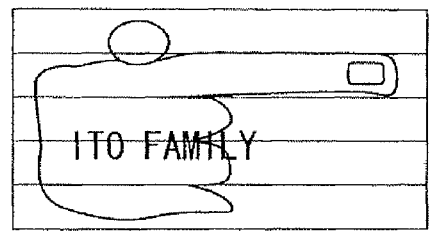
FIGS. 23A to 23G are completed image diagrams of a label design shape of the first embodiment.
Figure 23B:
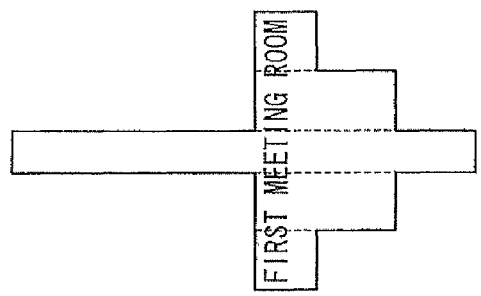
Figure 23C:
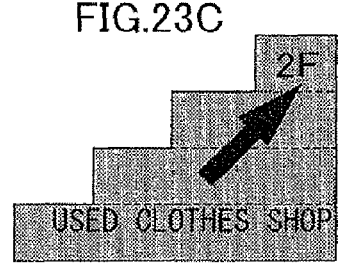
Figure 23D:
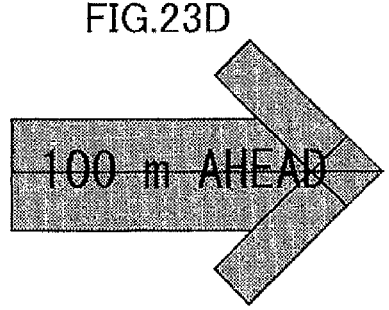
Figure 23E:
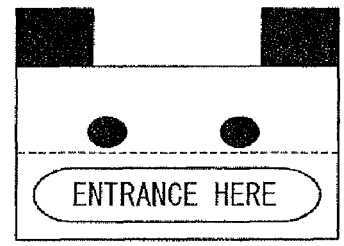
Figure 23F:
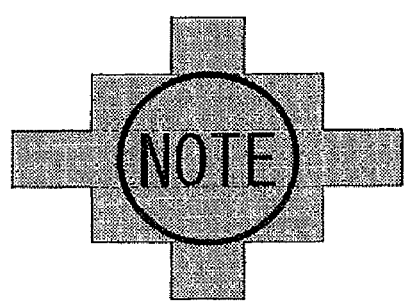
Figure 23G:
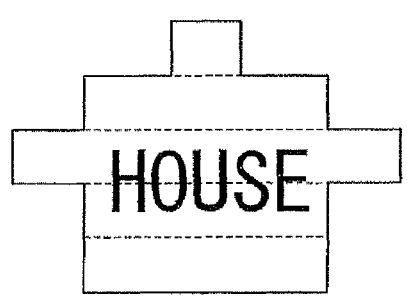

FIGS. 23A to 23G show examples of other label designs. FIG. 23A is another example of the "arrow" shape. In FIG. 23A, a figure indicating a direction with a finger and a destination ("Ito Family") are printed. FIG. 23B is the "arrow" shape indicating a direction of a "first meeting room". The characters of "first meeting room" are printed across five labels. FIG. 23C is a label design in the "stairs" shape for providing guidance that a "used clothes shop" is on the second floor. The characters of the "used clothes shop" and a figure of an "arrow" are printed across two labels. FIG. 23D is a label design in the "arrow" shape, in which characters of "100 m" are printed across two labels and characters of "ahead" are also printed across four labels. FIG. 23E is the shape of a "giant panda", in which guidance is printed in the mouth of the panda. FIG. 23F is a label design in which a character figure of "note" is printed on three labels. In FIG. 23G, a character of "house" is printed on two labels in the shape of "house".

As shown in FIG. 23, by printing an enlarged character, enlarged figure and the like across a plurality of constituent labels, tape usage can be reduced as compared with existing enlarged printing, and since display is enabled with the shape of the label design, its intension can be made clear.

The label design producing apparatus 1 can produce constituent labels for forming a label design selected by a user.

(B) Second Embodiment

Next, a second embodiment of the label design producing apparatus of the present invention will be described referring to the attached drawings.

In the first embodiment, the case where the constituent label is produced using a tape type (tape type of default setting) set in the label design setting form storage portion 22b is described.

On the other hand, in the second embodiment, a case where the constituent label is produced not limited to the tape type set in the label design setting form storage portion 22b will be described.

Since internal configuration of the label design producing apparatus in the second embodiment corresponds to the configuration shown in FIG. 1, FIG. 1 will be also used for explanaing the second embodiment.

The second embodiment is different from the first embodiment in contents of the label design production processing program executed by the CPU 21. Then, in the second embodiment, it is referred to as a label design production processing program 22c.

Figure 14:
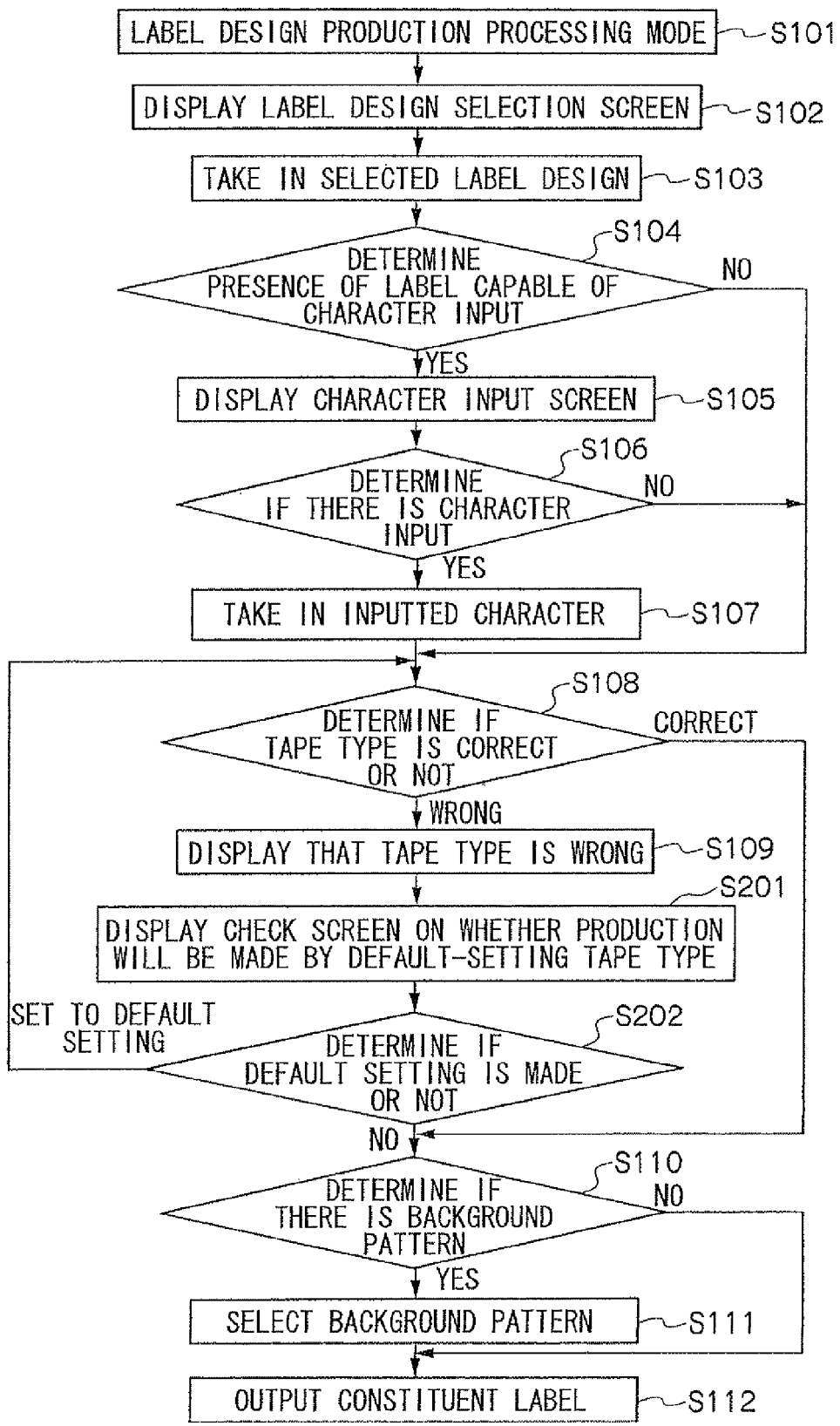
FIG. 14 is an operational flowchart illustrating production processing of a label design shape of a second embodiment.

FIG. 14 is an operational flowchart illustrating production processing of a label design shape in the second embodiment.

In FIG. 14, the processing, from bringing the label design producing apparatus 1 into the label design production processing mode to taking in input characters, corresponds to the processing described in the first embodiment, and detailed explanation will be omitted here (Steps S101 to S107).

When the input character taking-in processing is carried out, the CPU 21 determines if the tape type is correctly loaded or not based on the tape type detection result from the tape type detection sensor 12 (Step S108).

If the currently loaded tape type is not the default-setting tape type set in the label design setting form storage portion 22b, the CPU 21 displays, on the liquid crystal display 35, the fact that the tape cartridge TC with the set "tape width", "tape color" is not correctly loaded (step S109).

Also, the CPU 21 displays the check screen on the liquid crystal display 35 on whether or not the constituent labels are to be produced with the default-setting tape type (Step S201).

The user operates the key input portion 11 and selects if the constituent labels are to be produced with the default-setting tape type.

Upon receipt of the above, the CPU 21 determines if the label is to be produced with the default-setting tape type or not (Step S202), and in the case of the default-setting production, the routine returns to Step S108 and replacement to a correct tape cartridge TC is prompted, while in the case of production not with the default setting, the routine goes to Step S110 and the selection processing of the background pattern is performed.

Since the processing at step S110 and after corresponds to the processing described in the first embodiment, detailed description will be omitted.

As mentioned above, the user can form a label design using a tape type other than the tape types of default setting set in the label design setting form storage portion 22b.

FIG. 15 are diagrams illustrating formation examples of label designs using the tape type other than the default setting.

Figure 15A:
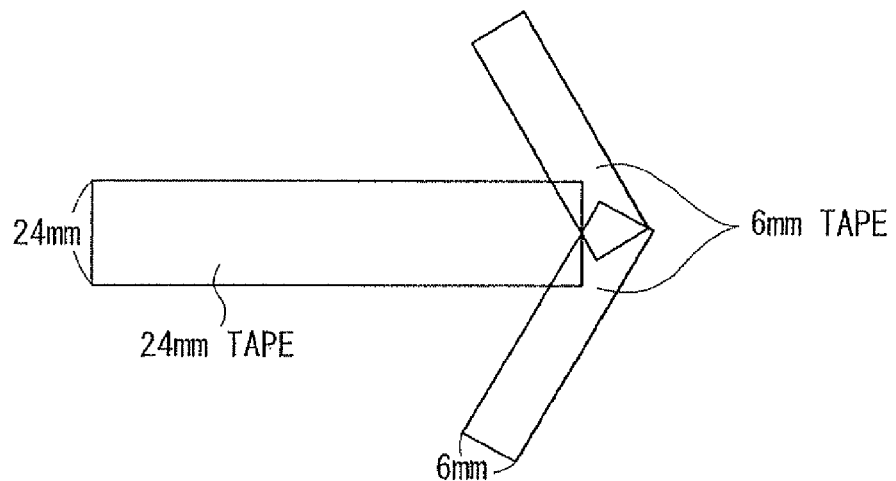
FIGS. 15A to 15C are diagrams illustrating a formation example of a label design shape using a tape type other than default setting of the second embodiment.
Figure 15B:
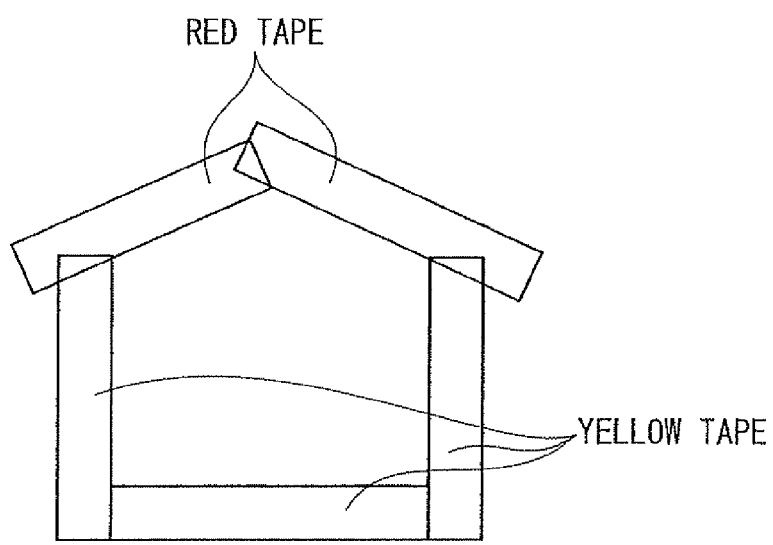
Figure 15C:
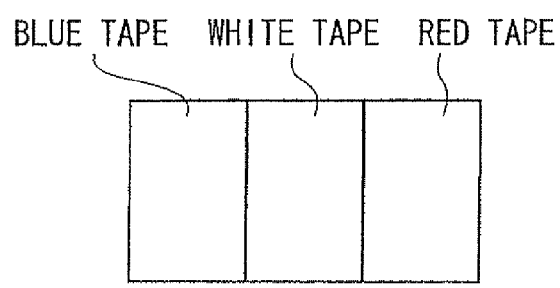

For example, FIG. 15A is an example that the "arrow" shape is formed using the tape with the tape width of 24 mm and the tape with the width of 6 mm. FIG. 15B is an example of formation of the "house" shape using red tape for a roof portion and yellow tape for a wall portion. Moreover, FIG. 15C is an example of a case of formation of a label design like a national flag by arranging blue tape, white tape and red tape.

By using the tape type other than the default setting as above, a label design shape can be freely formed according to preference of a user.

As mentioned above, according to the second embodiment, the same effect as the first embodiment is exerted. Also, according to the second embodiment, a label design shape can be formed not limited to the tape types with the default setting but with a tape type desired by a user.

(C) Third Embodiment

Next, a third embodiment of the label design producing device of the present invention will be described referring to the attached drawings.

The third embodiment is characterized by that a user can freely design a label design.

In the first and second embodiments, description is made mainly on the assumption that a dedicated label design producing apparatus (label producing device) is used, but in the third embodiment, a case where the present invention is applied to information processors with relatively high processing capacity such as a label producing apparatus connected to a personal computer and a stand-alone label producing device will be assumed and described.

It is needless to say that since the processing, which will be described later, is software processing, it can be also applied to a dedicated label design producing apparatus.

(C-1) Configuration of the Third Embodiment

As hardware configuration of the information processing apparatus (personal computer, stand-alone label producing apparatus and the like, for example) to be applied as the label design producing apparatus of the third embodiment, hardware configuration of existing information processing apparatus can be used. That is, predetermined information processing can be realized by providing a CPU, a memory portion (RAM, ROM and the like) and by executing processing programs stored in the ROM and the like by the CPU.

In the third embodiment, a label design production program 22d is executed by the CPU so as to realize the processing, which will be described later.

The label design production program 22d can be applied by using those stored in a recording medium capable of being read by the CPU, using those stored in hardware in advance or using those downloaded through an electric line.

A user produces a label design by operating an input device of a personal computer (mouse, keyboard and the like, for example) or an input device of a stand-alone label producing apparatus (mouse, keyboard, touch panel and the like, for example), for example.

Figure 16:
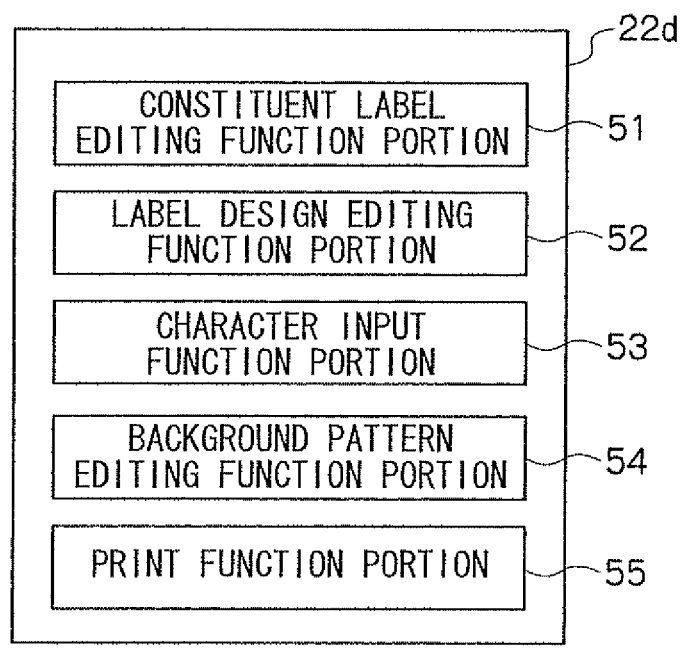
FIG. 16 is a functional block diagram for explaining a function realized by execution of a label design production program of a third embodiment.

FIG. 16 is a functional block diagram for explaining a function realized by execution of the label design production program 22d of the third embodiment.

As shown in FIG. 16, the label design production program 22d of the third embodiment at least has a constituent label editing function portion 51, a label deign editing function portion 52, a character input function portion 53, a background pattern editing function portion 54, and a print function portion 55.

The constituent label editing function portion 51 has a function to edit a length, width, color, quantity and the like of each constituent label constituting the label design.

The label deign editing function portion 52 has a function to edit a position, angle and the like of the constituent label. Methods of editing the constituent label include a method of moving the constituent label by a user using a mouse and the like or a method of inputting coordinates of a moving distance, moving angle and the like (parameter editing), for example.

The label design editing function 52 also has a function to chamfer a corner of a rectangular constituent label or to round it with an arc.

The character input function portion 53 sets the character, symbol, figure and the like inputted by a user at a position on the label design shape edited by the label design editing function portion 52 according to an instruction of the user.

The background pattern editing function portion 54 sets the background pattern selected by a user at a position on the label design shape edited by the label design editing function portion 52 according to an instruction of the user.

The print function portion 55 has the label design produced by operation of a user printed by the label producing apparatus.

The label design production program 22d may store configuration of the label design produced by the user. At this time, the title of the shape, the number of constituent labels, length, tape width, tape color of each constituent label may be set and registered in association.

(C-2) Operation of the Third Embodiment

Next, a label design production processing of the third embodiment will be described referring to the attached drawings.

First, a user operates an input device (mouse, keyboard, touch panel and the like, for example) to start the label design shape program 22d and set the label design production processing mode.

The CPU has a drawing screen for producing a label design displayed. The user carries out predetermined operation for producing a label design while looking at the drawing screen.

The user first edits the constituent label. The editing of the constituent label is enabled by selecting a constituent label editing button (icon) displayed on the drawing screen, for example.

Figure 17:
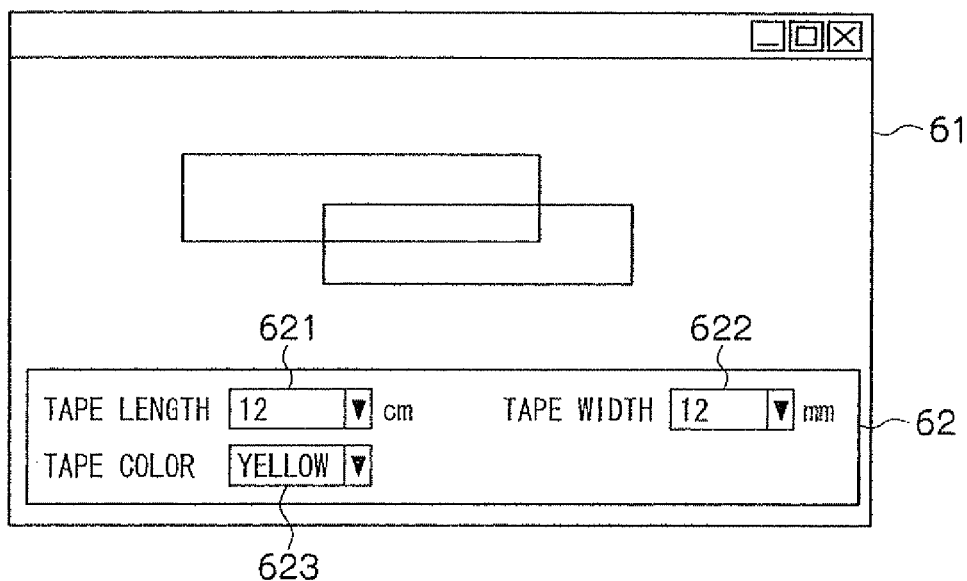
FIG. 17 is a diagram illustrating an example of a constituent label editing screen for editing a constituent label of the third embodiment.

For example, FIG. 17 shows an example of the drawing screen displayed on the operation screen. A drawing screen 61 shown in FIG. 17 displays a constituent label editing screen 62 for editing the constituent label.

On the constituent label editing screen 62, a tape length input portion 621, a tape width input portion 622, a tape color input portion 623 are provided for specifying the length, the tape width, the tape color of the constituent label, respectively.

The user can display the required number of constituent labels with the size required for a label design to function while looking at the constituent label editing screen 62.

As another editing method of the constituent label, a method of editing a constituent label by specifying x-coordinate and y-coordinate on the drawing screen can be also applied. For example, by operation of a mouse by a user or the like to specify a start point and an end point of a line segment, the tape length and tape width may be arbitrarily specified.

Next, the user edits the label design shape. It is made possible for the user to operate the display of the constituent label displayed on the drawing screen 61 by using the input device such as a mouse, for example.

The label design shape can be edited by moving the constituent label display, adjusting an angle, rotating, reversing or changing the sequence of overlapping of the constituent labels. By this arrangement, the position, angle and the like of each constituent label of the label design produced by the user can be adjusted.

Figure 18:
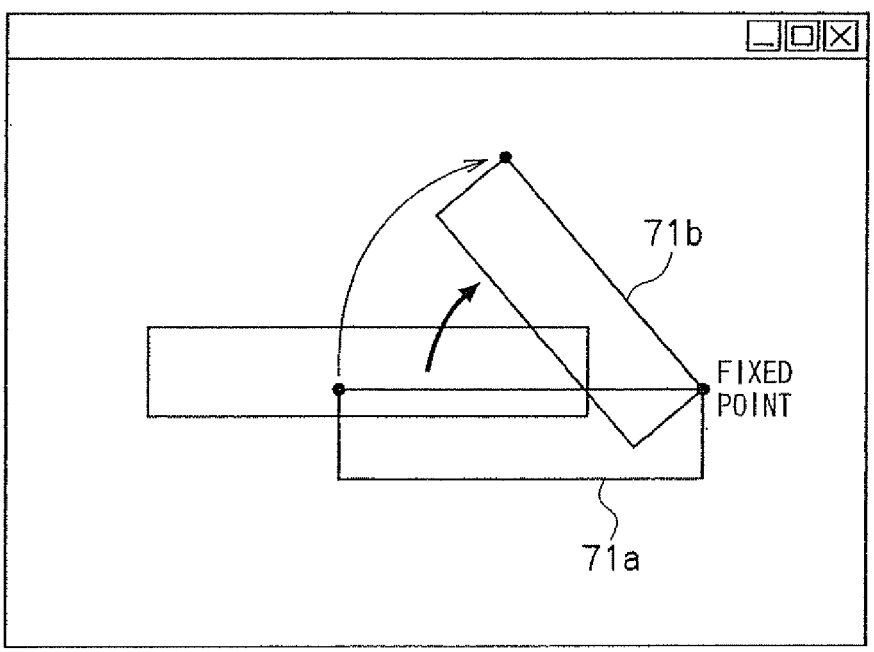
FIG. 18 is a diagram illustrating an example of an editing screen when an angle of constituent label display is adjusted in the third embodiment.

For example, FIG. 18 shows an editing screen example when the angle of the constituent label display is to be adjusted. In FIG. 18, first, a fixed point of the constituent label display is specified by using the input device such as a mouse. For example, in FIG. 18, an upper right corner of a constituent label display 71a is specified as a fixed point. Then, when the user operates the constituent label display 71a by using the input device such as a mouse while specifying the upper left corner of the constituent label display 71a, the angle of the constituent label display 71a can be changed with the fixed point as a base point. By this arrangement, the angle of the constituent label display 71a can be adjusted.

Subsequently, the user edits the character input, background pattern as necessary. The editing of the character input can be set by text-input of characters, symbols, figures and the like inputted by the user at a position specified by the user, for example. The editing of the background pattern can be set by selecting a background pattern selected by the user from the setting form of the background pattern set in advance.

At this time, the character input can be set so that an enlarged character is printed across a plurality of constituent labels. Also, which constituent label is to be front and which to be rear in the overlap portion of the constituent labels can be determined.

Figure 19A:
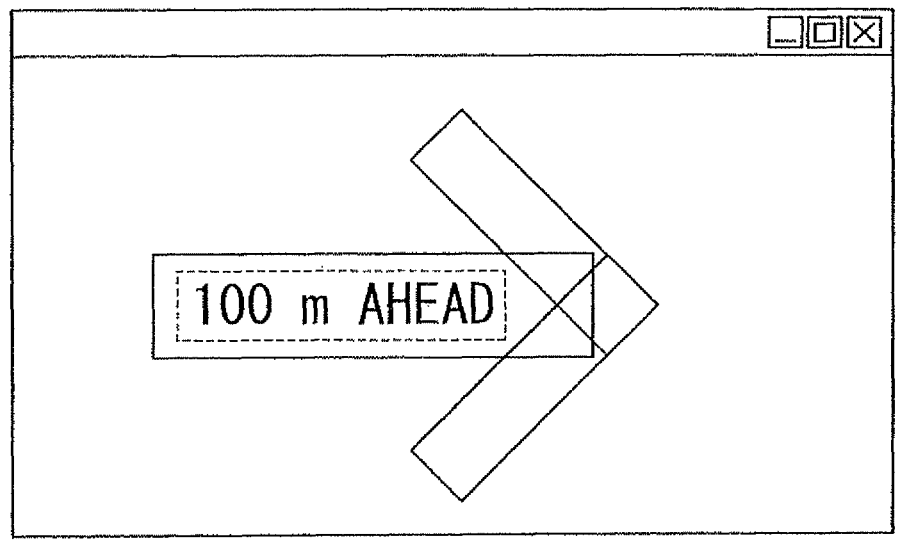
FIGS. 19A and 19B are completed images of a label design shape of the third embodiment.
Figure 19B:
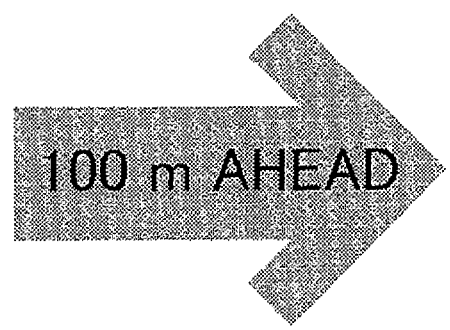

FIG. 19A is a finished image of a label design on the drawing screen 61. When the user produces a desired label design, the constituent labels can be produced and discharged with a predetermined print operation. And by combining the constituent labels, the label design shape as shown in FIG. 19B can be formed.

To the production and discharge processing of the constituent labels, the production and discharge processing of each constituent label described in the first and second embodiments can be applied. That is, at the production of constituent labels, the detection processing of the tape type of the loaded tape cartridge TC, processing of displaying the fact that the tape type is different, if any, and processing of discharging the constituent label with a guide label at discharge are carried out.

As mentioned above, according to the third embodiment, in addition to the advantages of the first and second embodiments, a label design desired by the user can be produced.

(D) Fourth Embodiment

Next, a fourth embodiment of the label design producing apparatus of the present invention will be described referring to the attached drawings.

The fourth embodiment is characterized in that when the user draws a desired label design shape, constituent labels are automatically arranged so that the label design can be formed and the label design can be freely designed.

For the fourth embodiment, similarly to the third embodiment, the case of application to information processors with relatively high processing capacity such as a label producing apparatus connected to a personal computer and a stand-alone label producing device will be assumed and described.

It is needless to say that since the processing as will be described later is software processing, it can be also applied to an exclusive label design producing apparatus.

(D-1) Configuration of the Fourth Embodiment

In the fourth embodiment, the processing which will be described later can be realized by execution of a label design production program 22e by the CPU.

The label design production program 22e can be applied by using those stored in a recording medium capable of being read by the CPU, using those stored in hardware in advance or using those downloaded through an electric line.

Figure 20:
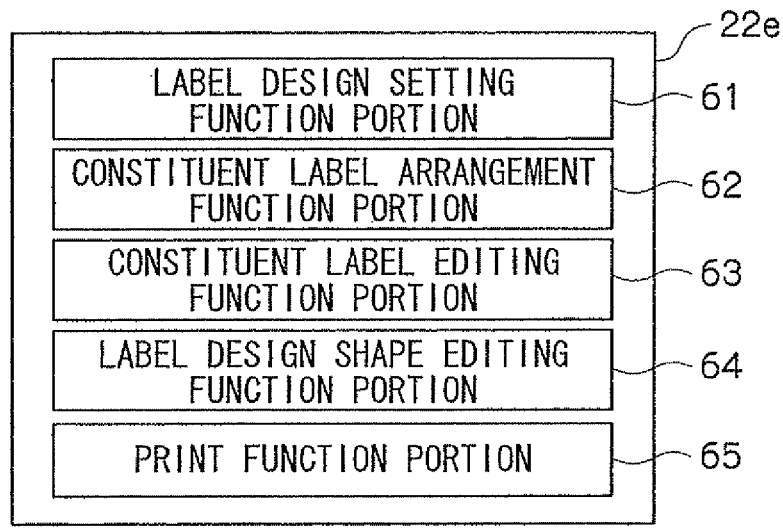
FIG. 20 is a functional block diagram for explaining a function realized by execution of a label design production program of a fourth embodiment.

FIG. 20 is a functional block diagram for explaining a function realized by execution of the label design production program 22e of the fourth embodiment.

As shown in FIG. 20, the label design production program 22e of the fourth embodiment at least has the label design shape setting function portion 61, the constituent label arrangement function portion 62, a constituent label editing function portion 63, a label design shape editing function portion 64, a print function portion 65.

The label design shape setting function portion 61 is a function of taking in a shape drawn by a user and setting it as a label design shape desired by the user.

The constituent label arrangement function portion 62 is a function to automatically arrange the constituent label so that the label design shape can be formed according to the label design shape drawn by a user and set by the label design shape setting function portion 61.

As the method of arranging a constituent label, a method of arranging a plurality of constituent labels so that the shape drawn by the user can be covered while the orientations in the width direction axis and the length direction axis of the constituent label are the same, and a method of arrangement by aligning the constituent labels along a shape line drawn by the user and the like can be applied, for example.

The constituent label editing function portion 63 is a function to edit the length, width, color, quantity and the like of the constituent label by user's operation after automatic arrangement of the constituent labels by the constituent label arrangement function portion 62.

The label design shape editing function portion 63 is a function for editing a position, angle and the like of a constituent label after automatic arrangement of the constituent label by the constituent label arrangement function portion 62.

The print function portion 65 has the label design shape produced by user's operation printed by the label producing device.

The label design shape production program 22e may store configuration of the label design shape produced by the user. At this time, the title of the shape, the number of constituent labels, the length, the tape width, the tape color of each constituent label may be set and registered in association.

(D-2) Operation of the Fourth Embodiment

Next, a label design production processing of the fourth embodiment will be described referring to the attached drawings.

First, a user operates an input device (mouse, keyboard, touch panel and the like, for example) to start the label design shape program 22e and set the label design production processing mode.

The CPU displays a drawing screen for producing a label design. The user carries out a predetermined operation to produce a label design while looking at the drawing screen.

The user first draws a shape desired as a label design on the drawing screen by using a mouse or the like. Upon receipt thereof, the CPU takes in the shape drawn by the user, displays the shape and sets the taken-in shape as the label design shape desired by the user.

Figure 21:
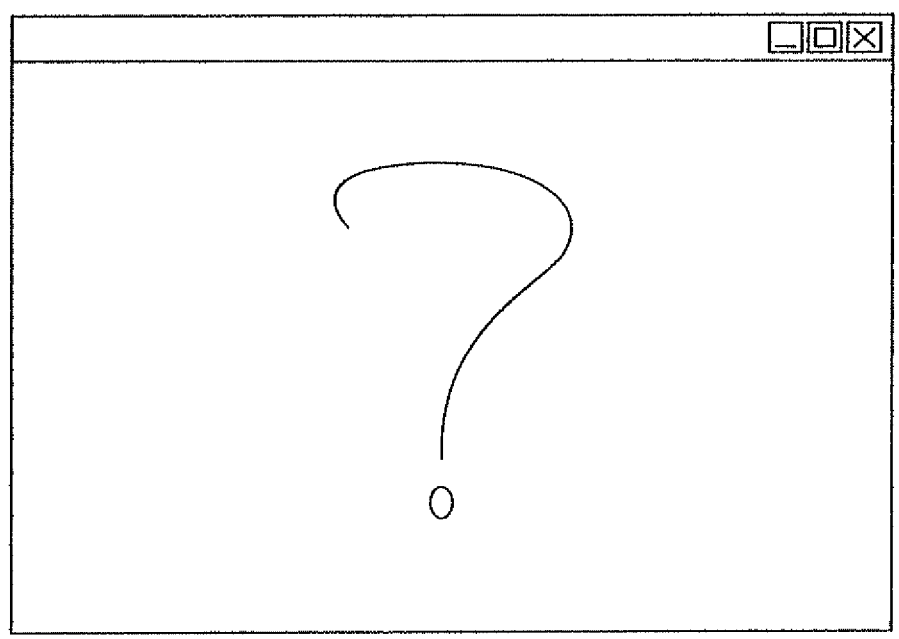
FIG. 21 is a diagram illustrating an example of a drawing screen for displaying a shape drawn by a user of the fourth embodiment.

FIG. 21 shows an example of the drawing screen displaying a shape drawn by a user, for example. FIG. 21 is a case where "? (Question mark)" is drawn by a user.

The CPU sets the shape drawn by the user as a label design shape and then, has constituent labels automatically arranged according to the drawn label design shape so that the label design shape can be formed.

At this time, the tape width to be arranged may be set by the user in advance or the setting may be changed by the constituent label editing function after automatic arrangement of the constituent label.

Figure 22A:
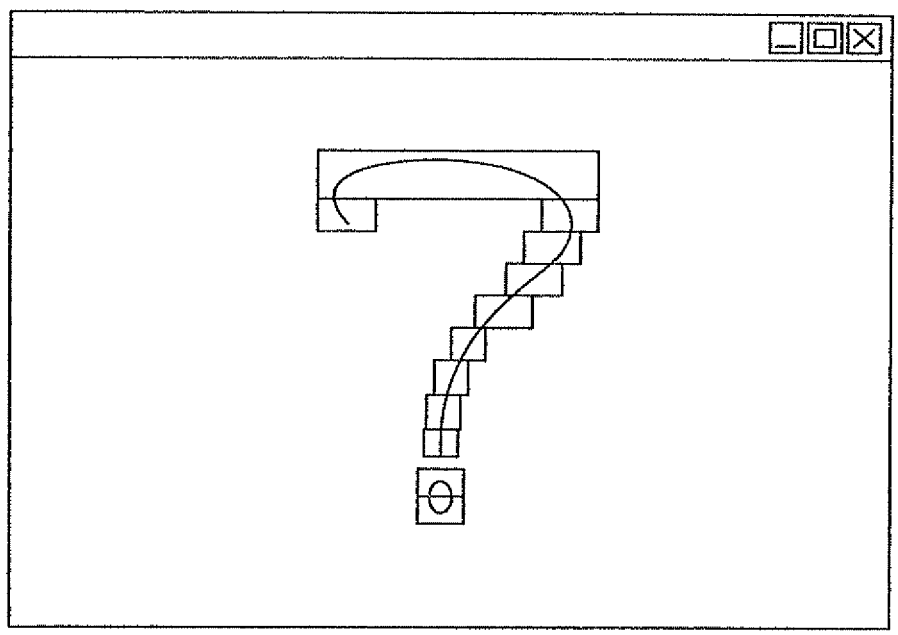
FIGS. 22A and 22B are example of the drawing screen when constituent labels of the fourth embodiment are arranged.
Figure 22B:
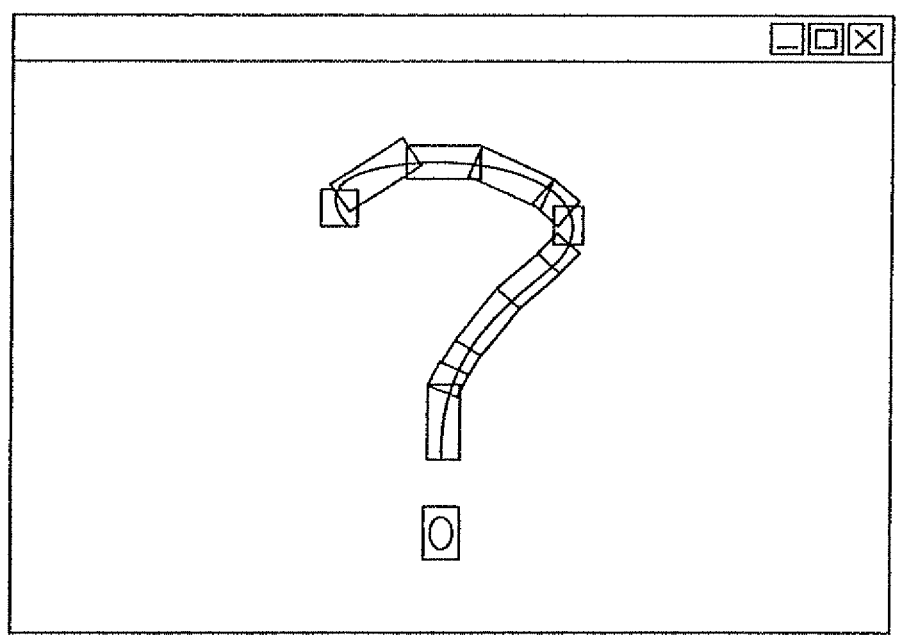

FIG. 22 is an example of the drawing screen when the constituent labels are arranged. As a method of arranging the constituent labels, there may be arrangement of the constituent labels so as to cover the drawn shape while the axis in the tape width direction and the axis in the tape length direction match each other as shown in 22A and arrangement by aligning the constituent labels along the shape line drawn by the user as shown in FIG. 22B.

With regard to the arrangement setting of the constituent label, if a change amount of a drawn shape curve is large, the length of the constituent label is decreased, while if the change amount of the shape curve is small, the length of the constituent label is increased.

Alternatively, in order to save a tape usage, adjustment of a margin for covering the drawn shape curve may be enabled.

Which of the constituent label arrangement methods is to be applied can be switched by selection of the user.

After the automatic arrangement of the constituent labels by the CPU, the user can carry out the constituent label editing processing and the label design shape editing processing as necessary. Since the processing described in the third embodiment can be applied to the constituent label editing processing and the label design shape editing processing, the detailed description will be omitted. Alternatively, the user may edit the character input, background pattern when necessary.

When the label design shape corresponding to the drawn shape is produced, the user conducts a predetermined print operation so as to produce and discharge each constituent label and combines the constituent labels so that the desired label design shape can be formed.

Since the production and discharge processing of each constituent label described in the first and second embodiments can be applied to the production and discharge processing of each constituent label, the detailed description here will be omitted.

As mentioned above, according to the fourth embodiment, in addition to the advantages of the first to third embodiments, a shape desired by a user can be formed as the label design shape.

Also, according to the fourth embodiment, since the size of the label design shape can be set to a size desired by a user, a label design more suitable to the desire of the user can be formed.

(E) Other Embodiments

Various variations have been described in the first to fourth embodiments but the other variations will be described below.

(E-1) Operational flows shown in FIGS. 6 and 14 are exemplification and the processing sequence shown in FIGS. 6 and 14 is not particularly limiting.

(E-2) The label design setting form storage portion 22b may store a plurality of label design shapes in a hierarchical manner for each field of label design shape.

For example, the label design shape setting storage portion 22b may store various setting forms such that classification is made with a broader concept of "animal", "figure", "character" and the like and a narrower concept of the "animal", for example, with "giant panda", "giraffe" and the like.

(E-3) In the first to fourth embodiments, the display unit such as a liquid crystal display may display a size (length× width) after the labels are bonded together. In this case, information indicating the size of the entire label of the setting form is set in advance so that the information indicating the size of the entire label is displayed by the CPU upon selection by a user.

The size of the entire label can be changed upon receipt of user's operation. In this case, the tape width, tape length shall be also changed according to the change in size of the entire label, for example, so as to have a design substantially in the shape similar to the design presented at first.

(E-4) In the first to fourth embodiments, if the number of labels constituting a design is large, guidance (half cut margin in FIG. 10, for example or symbols (bonding position in FIG. 11, for example)) may be automatically provided. A threshold value on the number of labels can be set as appropriate.

Moreover, numerals (suitably small in size) may be also printed on the side to be bonded together (label to be the side of front, for example, the number "3" in FIG. 11C and the like). At this time, by giving the same numbers to the points to be bonded together, formation of the label can be prompted by bonding the numbers together.

As shown in FIG. 10, if the guide label is affixed to the beginning, the number indicated on the guide label may be given to the half cut margin.

(E-5) The label combination information in the first to fourth embodiments is set as a setting form in advance, but instead of using this setting form, selection/specification of the combination by a user may be enabled. By this arrangement, the label design can be formed by label information desired by the user.

(E-6) The following technical idea is derived from the first to fourth embodiments.

(1) The label design producing apparatus of the present application comprises a label design input unit for receiving input of a label design that a user wants to produce and a constituent label producing unit for producing a plurality of constituent labels required to form the label design inputted by the label design input unit, and the label design is formed by combining the plurality of constituent labels produced by the constituent label producing unit.

According to the label design producing apparatus, the design inputted by a user or the like can be constituted by a plurality of constituent labels and the constituent labels can be outputted.

(2) The label design producing apparatus of the present application comprises a label design setting information storing unit for storing setting information in which at least the number of constituent labels and the length of the constituent label are set for each of plural types of label design, and the constituent label producing unit produces a plurality of constituent labels on the basis of the setting information of the label design set in the label design setting information storing unit.

According to the label design producing apparatus, since the label design setting information can be stored, the constituent labels that can form the label design can be outputted on the basis of the label design setting information.

(3) In the label design producing apparatus in (1), the label design input unit adjusts a combination form of the constituent labels constituting the label design upon receipt of a user operation and allows for unique combination forms. The constituent label producing device produces each constituent label of the label design formed in the unique combination form.

According to the label design producing apparatus, the label design can be produced by combination unique to users.

(4) In the label design producing apparatus in (1) or (3), the label design input unit takes in input of a drawn shape drawn by a user and arranged a plurality of rectangular shapes so as to cover the inputted drawn shape, and the constituent label producing unit produces the plurality of rectangular shapes arranged for the drawn shape as the constituent label when the drawn shape is made into a label design.

According to this label design producing apparatus, constituent labels can be automatically assigned to the shape drawn by a user and the constituent labels can be outputted.

(5) In the label design producing apparatus in any one of (1) to (4), the constituent label producing unit also outputs at least one of an image of the combined shape of the label design and a combination method of the label design at the same time at output of the constituent label.

According to the label design producing apparatus, since the label design combination method can be also outputted at the same time, the user can easily create the label design.

(6) In the label design producing apparatus in any one of (1) to (5), the constituent label producing unit prints and outputs an index indicating a combination position of constituent labels on each constituent label at the output of each constituent label.

According to the label design producing apparatus, since the index indicating the combination position can be automatically printed, the user can easily create the label design.

(7) In the label design producing apparatus in (6), the guidance showing the combination position of constituent labels is printed on the half cut margin of one or plural constituent labels by the constituent label producing unit.

According to the label design producing apparatus, since the guidance showing the combination position can be printed on the half cut margin, the user can easily create the label design.

(8) In the label design producing apparatus in any one of (1) to (7), an image forming unit for forming one or plural images on one or plural constituent labels is further provided.

According to the label design producing apparatus, by providing the image forming unit for printing an image on a label, character, symbol, pattern and the like can be printed on the label.

The invention claimed is:

1. A label design producing apparatus comprising:
   a first memory unit in which a plurality of different design shapes are stored;
   a second memory unit in which is stored label combination information, for each of the stored design shapes, expressing a plurality of labels of rectangular shape which are combinable so that a shape of the combined labels forms a specific shape which a stored design shape specifies;
   a selecting unit that selects at least one design shape from the plurality of design shapes stored in the first memory unit;
   a reading-out unit that reads out label combination information corresponding to the selected design shape from the second memory;
   an output unit that outputs each of the labels constituting the selected design shape according to the label combination information read out by the reading-out unit and
   a guide output unit that outputs a guide image which includes a whole shape image showing the selected design consisting of the labels on a label different from each of the labels constituting the design.

2. The label design producing apparatus according to claim 1, further comprising:
   an image forming region setting unit that sets a region in which one image or plural images are formed in a region formed by overlapping and bonding the labels as specified by the label combination information;
   an image producing unit that determines an image to be formed in the region; and
   an image forming unit that forms the image determined by the image producing unit in the region set by the image forming region setting unit.

3. The label design producing apparatus according to claim 1, further comprising:
   an image forming region setting unit that sets a region in which one image or plural images are formed in a region formed by overlapping and bonding the labels as specified by the label combination information;
   an image input unit that inputs an image to be formed in the region; and
   an image forming unit that forms the image inputted by the image input unit in the region set by the image forming region setting unit.

4. The label design producing apparatus according to claim 1, further comprising:
   a display unit for displaying a guide screen indicating how to bond labels together for their combined rectangular shapes to form the selected design shape, the guide screen including a whole shape image which shows the selected design shape consisting of the labels and combination sequence for each of the labels.

5. The label design producing apparatus according to claim 1, further comprising a guide image forming unit for forming an image guide indicating a position where another label is to be overlapped and bonded onto one label to give the selected design shape, and wherein an image of a symbol for identifying the label is formed on the other label and the image of the symbol is formed at the position where the other label is to be overlapped and bonded onto the one label.

6. The label design producing apparatus according to claim 1 wherein the label combination information includes a length of each label.

7. The label design producing apparatus according to claim 1, wherein the guide image further including an image showing combination sequence for each of the labels.

8. A label design producing apparatus comprising:
a first memory unit in which a plurality of different design shapes are stored;
a selecting unit that selects a design shape from the different design shapes stored in the first memory unit;
an expanding unit that generates label combination information for the selected design shape, the generated label combination information expressing a plurality of labels of rectangular shape which are combinable so that a shape of the combined labels forms a specific shape which a selected design shape specifies;
an output unit that outputs each of the labels constituting the selected design shape according to the label combination information generated by the expanding unit; and
a guide output unit that outputs a guide image which includes a whole shape image showing the selected design consisting of the labels on a label different from each of the labels constituting the design.

9. The label design producing apparatus according to claim 8, further comprising:
an image forming region setting unit that sets a region in which one image or plural images are formed in a region formed by overlapping and bonding the labels as specified by the label combination information;
an image producing unit that determines an image to be formed in the region; and
an image forming unit that forms the image determined by the image producing unit in the region set by the image forming region setting unit.

10. The label design producing apparatus according to claim 8, further comprising:
an image forming region setting unit that sets a region in which one image or plural images are formed in a region formed by overlapping and bonding the labels as specified by the label combination information;
an image input unit that inputs an image to be formed in the region; and
an image forming unit that forms the image inputted by the image input unit in the region set by the image forming region setting unit.

11. The label design producing apparatus according to claim 8, further comprising:
a display unit for displaying a guide screen indicating how to bond labels together for their combined rectangular shapes to form the selected design shape, the guide screen including a whole shape image which shows the selected design shape consisting of the labels and combination sequence for each of the labels.

12. The label design producing apparatus according to claim 8, further comprising a guide image forming unit for forming an image guide indicating a position where another label is to be overlapped and bonded onto one label to give the selected design shape, and wherein an image of a symbol for identifying the label is formed on the other label and the image of the symbol is formed at the position where the other label is to be overlapped and bonded onto the one label.

13. The label design producing apparatus according to claim 8 wherein the label combination information includes a length of each label.

14. The label design producing apparatus according to claim 8, wherein the guide image further including an image showing combination sequence for each of the labels.

15. A label design producing method comprising:
storing a plurality of different shapes;
selecting at least one design shape from the plurality of design shapes;
outputting a plurality of labels of rectangular shape which are combinable so that a shape of the combined labels forms a specific shape which a selected design shape specifies; and
generating label combination information for the selected design shape, the generated label combination information expressing the selected design shape as a combination of rectangular shapes of labels, wherein
each of the labels is outputted according to the generated label combination information.

16. The label design producing method according to claim 15, further comprising:
storing label combination information for each of the stored design shapes, expressing a plurality of labels of rectangular shape, wherein
each of the labels is outputted according to the stored label combination information.

* * * * *